United States Patent
You et al.

(10) Patent No.: US 10,356,695 B2
(45) Date of Patent: Jul. 16, 2019

(54) METHOD AND USER EQUIPMENT FOR RECEIVING SYSTEM INFORMATION, AND METHOD AND BASE STATION FOR TRANSMITTING SYSTEM INFORMATION

(71) Applicant: LG ELECTRONICS INC., Seoul (KR)

(72) Inventors: Hyangsun You, Seoul (KR); Hanbyul Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 15/548,755

(22) PCT Filed: Feb. 5, 2016

(86) PCT No.: PCT/KR2016/001320
§ 371 (c)(1),
(2) Date: Aug. 3, 2017

(87) PCT Pub. No.: WO2016/126142
PCT Pub. Date: Aug. 11, 2016

(65) Prior Publication Data
US 2018/0027483 A1 Jan. 25, 2018

Related U.S. Application Data

(60) Provisional application No. 62/144,967, filed on Apr. 9, 2015, provisional application No. 62/112,692, filed on Feb. 6, 2015.

(51) Int. Cl.
*H04L 5/00* (2006.01)
*H04W 48/12* (2009.01)
(Continued)

(52) U.S. Cl.
CPC ......... *H04W 48/12* (2013.01); *H04J 11/0086* (2013.01); *H04L 5/0053* (2013.01);
(Continued)

(58) Field of Classification Search
None
See application file for complete search history.

(56) References Cited

U.S. PATENT DOCUMENTS 9,743,352 B2 * 8/2017 Hoglund ............ H04W 52/0216
2008/0318566 A1 * 12/2008 Chun .................... H04W 48/12
455/422.1
(Continued)

FOREIGN PATENT DOCUMENTS

| KR | 1020090078747 | 7/2009 |
|----|---------------|--------|
| KR | 1020110079868 | 7/2011 |

(Continued)

OTHER PUBLICATIONS

PCT International Application No. PCT/KR2016/001320, Written Opinion of the International Searching Authority dated Jun. 24, 2016, 35 pages.
(Continued)

*Primary Examiner* — Brian S Roberts
(74) *Attorney, Agent, or Firm* — Lee Hong Degerman Kang & Waimey

(57) ABSTRACT

A system information update notification may be transmitted/received in system information modification period n, updated system information may be transmitted/received in system information modification period (n+1), and the updated system information may be applied from a particular time point after the system information modification period (n+1). The updated system information may include
(Continued)

EPDCCH configuration information or start OFDM symbol information which enables a UE to start control/data reception.

12 Claims, 16 Drawing Sheets

(51) Int. Cl.
 *H04J 11/00* (2006.01)
 *H04W 48/16* (2009.01)
(52) U.S. Cl.
 CPC .......... *H04L 5/0082* (2013.01); *H04L 5/0091* (2013.01); *H04W 48/16* (2013.01)

(56) References Cited

U.S. PATENT DOCUMENTS

| | | | | |
|---|---|---|---|---|
| 2009/0124245 A1* | 5/2009 | Somasundaram | .... | H04W 48/16 455/418 |
| 2010/0267366 A1* | 10/2010 | Du | ........ | H04W 48/08 455/412.2 |
| 2012/0052860 A1* | 3/2012 | Faronius | ........ | H04W 68/02 455/426.1 |
| 2012/0099464 A1* | 4/2012 | Chun | ........ | H04L 5/00 370/252 |
| 2013/0064185 A1* | 3/2013 | Jamadagni | ........ | H04L 5/001 370/328 |
| 2014/0112217 A1* | 4/2014 | Ahn | ........ | H04B 7/2656 370/280 |

FOREIGN PATENT DOCUMENTS

| | | |
|---|---|---|
| KR | 1020120041140 | 4/2012 |
| WO | 2010150998 | 12/2010 |

OTHER PUBLICATIONS

3rd Generation Partnership Project (3GPP), "Technical Specification Group Radio Access Network; Evolved Universal Terrestrial Radio Access (E-UTRA) Radio Resource Control (RRC); Protocol specification (Release 8)," 3GPP TS 36.331 V8.0.0, Dec. 2007, 56 pages.

* cited by examiner

FIG. 5
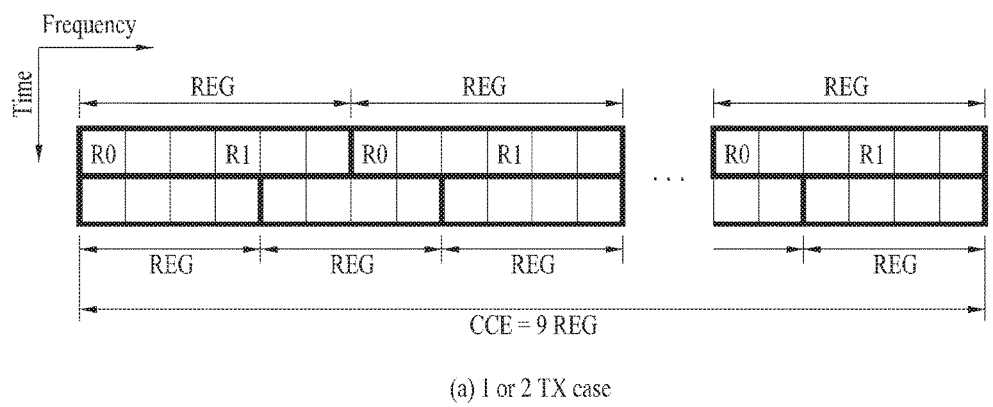
(a) 1 or 2 TX case
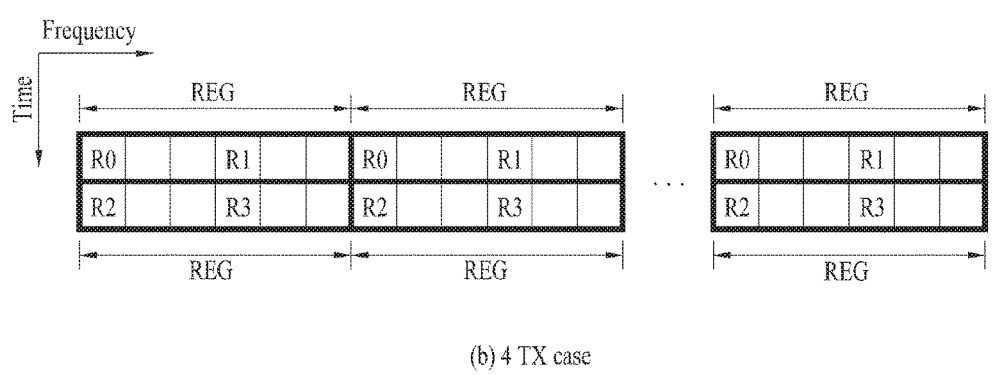
(b) 4 TX case

- [p] RE occupied by CRS of port p ( p∈0, p∈0,1 or p∈0,1,2,3 )
- ▨ RE occupied by UE-RS of port(s) p ( p∈7, p∈8, p∈7,8 or p∈7,8,11,13 )
- ▧ RE occupied by UE-RS of port(s) p ( p∈9, p∈10, p∈9,10 or p∈9,10,12,14 )

METHOD AND USER EQUIPMENT FOR RECEIVING SYSTEM INFORMATION, AND METHOD AND BASE STATION FOR TRANSMITTING SYSTEM INFORMATION

CROSS-REFERENCE TO RELATED APPLICATIONS

This application is the National Stage filing under 35 U.S.C. 371 of International Application No. PCT/KR2016/001320, filed on Feb. 5, 2016, which claims the benefit of U.S. Provisional Application No. 62/112,692, filed on Feb. 6, 2015 and 62/144,967, filed on Apr. 9, 2015, the contents of which are all hereby incorporated by reference herein in their entirety.

TECHNICAL FIELD

The present invention relates to a wireless communication system, and more particularly, to a method and apparatus for transmitting and receiving system information.

BACKGROUND ART

With appearance and spread of machine-to-machine (M2M) communication and a variety of devices such as smartphones and tablet PCs and technologies demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted within limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

Meanwhile, a communication environment evolves into an environment that density of a node that may be accessed by a UE is increased. The node means a fixed point that includes one or more antennas to transmit/receive radio signals to and from a UE. A communication system provided with a node of high density may provide the UE with a communication service of higher throughput through cooperation between nodes.

DISCLOSURE

Technical Problem

Due to the introduction of new radio communication technology, the number of user equipments (UEs) to which a BS should provide a service in a predetermined resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solution

A method of receiving system information by a user equipment (UE), the method comprising: receiving a system information update notification in a system information modification period n; receiving updated system information in a system information modification period (n+1); and applying the updated system information at a specific time after the system information modification period (n+1).

Additionally or alternatively, the specific time comprises a system information modification period (n+2), which is next to the system information modification period (n+1).

Additionally or alternatively, method further comprising receiving information indicating the specific time.

Additionally or alternatively, the information indicating the specific time is included in the updated system information and thus received in the system information modification period (n+1).

Additionally or alternatively, the information indicating the specific time is received in every system information modification period and wherein when the updated system information is applied, the information indicating the specific time is set to a specific value and then received.

Additionally or alternatively, the updated system information includes information on a length of an updated modification period, wherein the updated system information including the information on the length of the updated modification period is received through a master information block, and wherein the updated system information includes at least one of information indicating whether the updated system information has been applied or will be applied, information on a length of a modification period before the updated modification period, and information on a length of a modification period in which the updated system information will be received.

Additionally or alternatively, the updated system information includes at least one of search space information of an enhanced physical downlink control channel (EPDCCH) received in a data region of a subframe rather than a control region of the subframe and start symbol information indicating a start orthogonal frequency division multiplexing (OFDM) symbol of the EPDCCH.

A user equipment (UE) for receiving system information, the UE comprising: a radio frequency (RF) unit; and a processor configured to control the RF unit, wherein the processor is configured to: control the RF unit to receive a system information update notification in a system information modification period n; control the RF unit to receive updated system information in a system information modification period (n+1); and apply the updated system information at a specific time after the system information modification period (n+1).

Additionally or alternatively, the specific time comprises a system information modification period (n+2), which is next to the system information modification period (n+1).

Additionally or alternatively, the processor is configured to further receive information indicating the specific time.

Additionally or alternatively, the information indicating the specific time is included in the updated system information and thus received in the system information modification period (n+1).

Additionally or alternatively, the information indicating the specific time is received in every system information modification period and wherein when the updated system information is applied, the information indicating the specific time is set to a specific value and then received.

Additionally or alternatively, the updated system information includes information on a length of an updated modification period, wherein the updated system information including the information on the length of the updated modification period is received through a master information block, and wherein the updated system information includes at least one of information indicating whether the updated system information has been applied or will be applied, information on a length of a modification period before the updated modification period, and information on a length of a modification period in which the updated system information will be received.

Additionally or alternatively, the updated system information includes at least one of search space information of an enhanced physical downlink control channel (EPDCCH) received in a data region of a subframe rather than a control region of the subframe and start symbol information indicating a start orthogonal frequency division multiplexing (OFDM) symbol of the EPDCCH.

A method of transmitting system information by an evolved node B (eNB), the method comprising: transmitting a system information update notification in a system information modification period n; transmitting updated system information in a system information modification period (n+1); and applying the updated system information at a specific time after the system information modification period (n+1).

An evolved node B (eNB) for transmitting system information, the eNB comprising: a radio frequency (RF) unit; and a processor configured to control the RF unit, wherein the processor is configured to: control the RF unit to transmit a system information update notification in a system information modification period n; control the RF unit to transmit updated system information in a system information modification period (n+1); and apply the updated system information at a specific time after the system information modification period (n+1).

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a resource unit used to configure a downlink control channel;

BEST MODE FOR INVENTION

Figure 1:
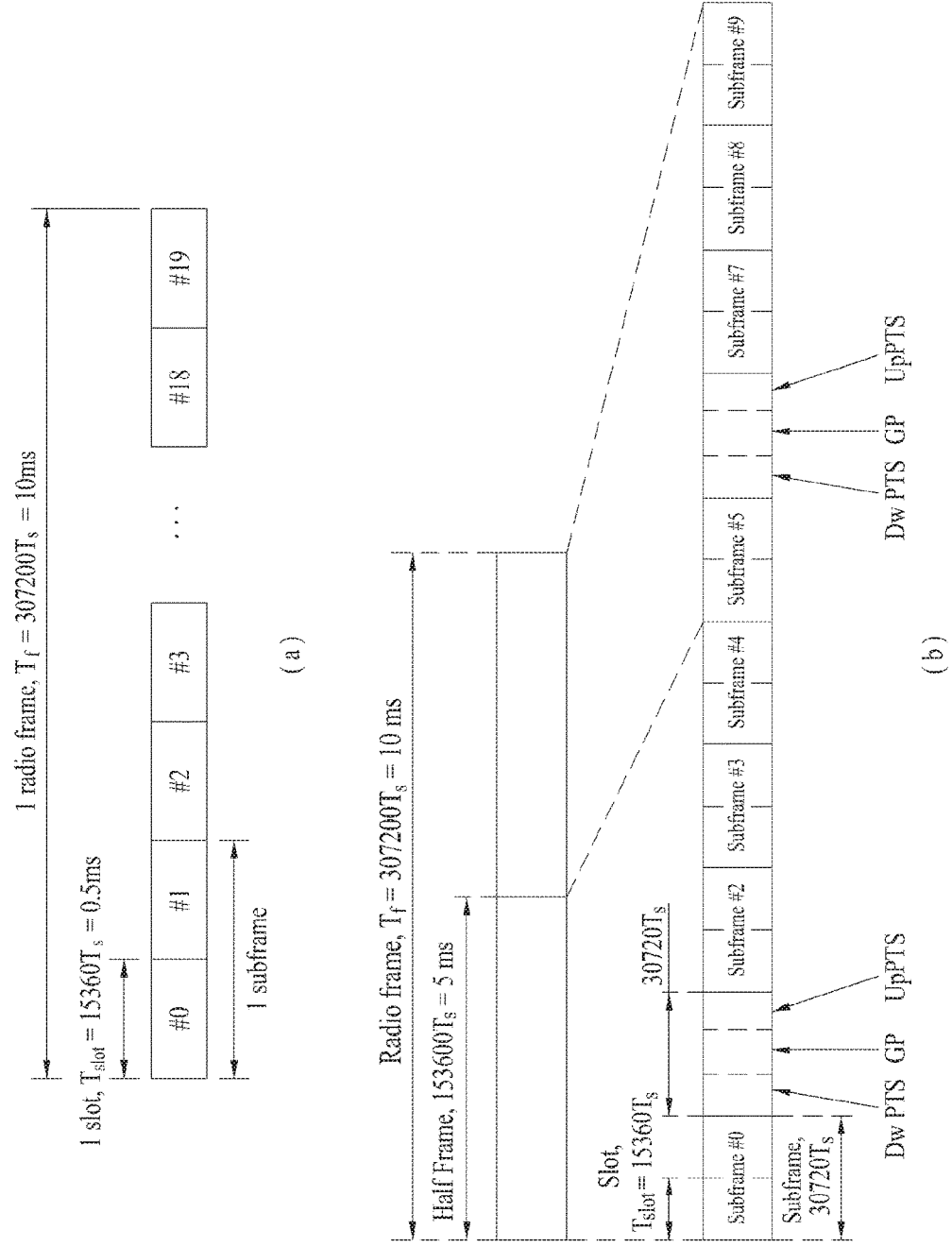
FIG. 1 illustrates an example of a radio frame structure used in a wireless communication system.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE) (that is, GERAN). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunication system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmission device determines whether another transmission is being performed before attempting to transmit traffic to a reception device. In other words, the transmission device attempts to detect the presence of a carrier from another transmission device before attempting to perform transmission. Upon sensing the carrier, the transmission device waits for another transmission device which is performing transmission to finish transmission, before initiating transmission thereof. Consequently, CSMA can be a communication scheme based on the principle of "sense before transmit" or "listen before talk". A scheme for avoiding collision between transmission devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission, and CSMA/CD is a scheme for flexibly transmitting data by monitoring collision. A transmission device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In the LTE/LTE-A based system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will later be described in detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH resource, respectively. Hereinafter, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe, and a subframe in which a synchronization signal (e.g., PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the terms CRS/UE-RS/CSI-RS/TRS ports may also be used to indicate a pattern of REs occupied by CRSs/UE-RSs/CSI-RSs/TRSs in a predetermined resource region.

FIG. 1 illustrates an example of a radio frame structure used in a wireless communication system.

Specifically, FIG. 1(*a*) illustrates an exemplary structure of a radio frame for frequency division multiplexing (FDD) used in a 3GPP LTE/LTE-A system, and FIG. 1(*b*) illustrates an exemplary structure of a radio frame for time division multiplexing (TDD) used in a 3GPP LTE/LTE-A system.

Referring to FIG. 1, the radio framed used in a 3GPP LTE/LTE-A system is 10 ms (307200 Ts) in duration. The radio frame is divided into 10 subframes (SFs) of equal size. Subframe numbers may be assigned to the 10 subframes within one radio frame, respectively. In this case, Ts denotes sampling time and is represented by Ts=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may be configured differently depending on duplex modes. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Table 1 shows an exemplary UL-DL configuration of subframes within a radio frame in TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). The DwPTS is a time slot reserved for DL transmission and the UpPTS is a time slot reserved for UL transmission. Table 2 shows an example of the special subframe configuration.

Figure 2:
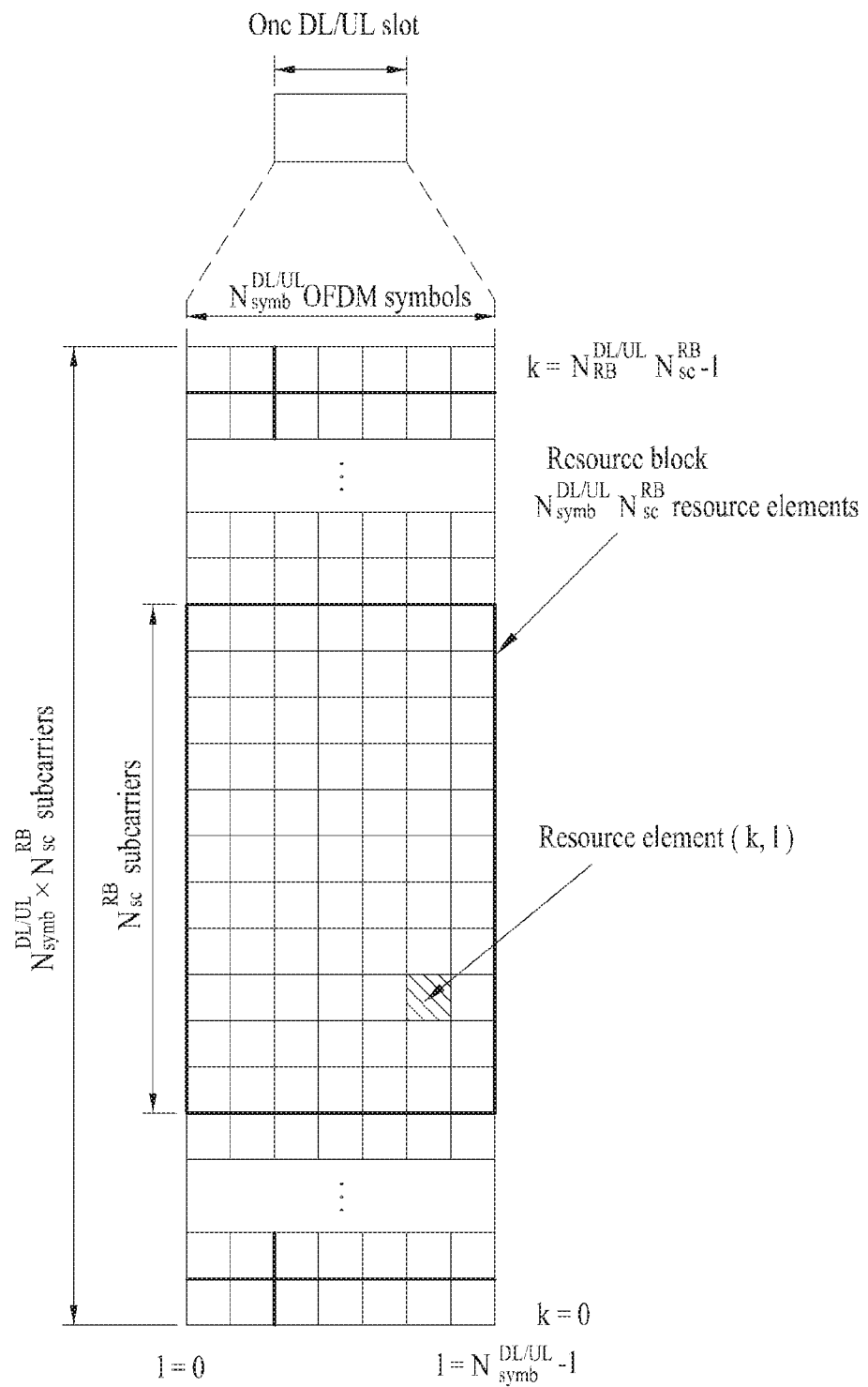
FIG. 2 illustrates an example of a downlink (DL)/uplink (UL) slot structure in a wireless communication system.

(RBs) in the frequency domain. The OFDM symbol may refer to one symbol duration. Referring to FIG. 2, a signal transmitted in each slot may be expressed by a resource grid including NDL/ULRB*NRBsc subcarriers and NDL/ULsymb OFDM symbols. NDLRB denotes the number of RBs in a DL slot and NULRB denotes the number of RBs in a UL slot. NDLRB and NULRB depend on a DL transmission bandwidth and a UL transmission bandwidth, respectively. NDLsymb denotes the number of OFDM symbols in a DL slot, NULsymb denotes the number of OFDM symbols in a UL slot, and NRBsc denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in case of a normal cyclic prefix (CP), one slot includes 7 OFDM symbols. In case of an extended CP, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes NDL/ULRB*NRBsc subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is mapped to a carrier frequency f0 in a process of generating an OFDM signal or in a frequency up-conversion process. The carrier frequency is also called a center frequency fc.

One RB is defined as NDL/ULsymb (e.g., 7) consecutive OFDM symbols in the time domain and as NRBsc (e.g., 12) consecutive subcarriers in the frequency domain. For reference, a resource comprised of one OFDM symbol and one subcarrier is referred to a resource element (RE) or tone. Accordingly, one RB includes NDL/ULsymb*NRBsc REs. Each RE within a resource grid may be uniquely defined by an index pair (k,l) within one slot. k is an index ranging from

TABLE 2

| | Normal cyclic prefix in downlink | | | Extended cyclic prefix in downlink | | |
|---|---|---|---|---|---|---|
| Special | | UpPTS | | | UpPTS | |
| subframe config-uration | DwPTS | Normal cyclic prefix in uplink | Extended cyclic prefix in uplink | DwPTS | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | 4384 · Ts | 5120 · Ts |
| 5 | 6592 · Ts | 4384 · Ts | 5120 · Ts | 20480 · Ts | | |
| 6 | 19760 · Ts | | | 23040 · Ts | | |
| 7 | 21952 · Ts | | | 12800 · Ts | | |
| 8 | 24144 · Ts | | | — | — | — |
| 9 | 13168 · Ts | | | — | — | — |

FIG. 2 illustrates an example of a DL/UL slot structure in a wireless communication system.

Referring to FIG. 2, a slot includes a plurality of orthogonal frequency division multiplexing (OFDM) symbols in the time domain and includes a plurality of resource blocks 0 to NDL/ULRB*NRBsc−1 in the frequency domain, and l is an index ranging from 0 to NDL/ULsymbl−1 in the time domain.

Meanwhile, one RB is mapped to one physical resource block (PRB) and one virtual resource block (VRB). A PRB is defined as NDLsymb (e.g., 7) consecutive OFDM or SC-FDM symbols in the time domain and NRBsc (e.g., 12) consecutive subcarriers in the frequency domain. Accordingly, one PRB includes NDL/ULsymb*NRBsc REs. In one subframe, two RBs each located in two slots of the subframe while occupying the same NRBsc consecutive subcarriers are referred to as a physical resource block (PRB) pair. Two RBs configuring a PRB pair have the same PRB number (or the same PRB index).

Figure 3:
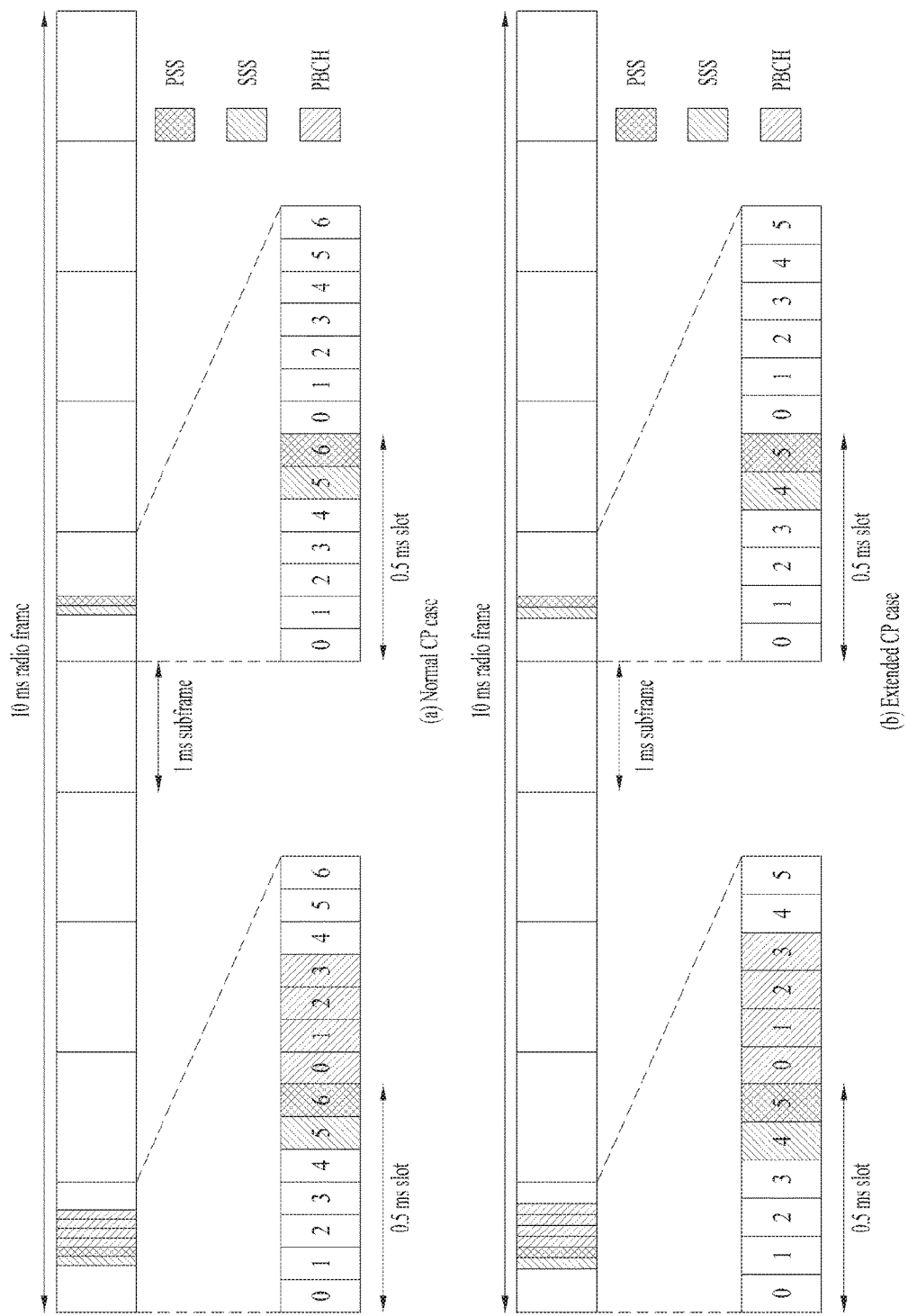
FIG. 3 illustrates a radio frame structure for transmission of a synchronization signal (SS)

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity NcellID of the cell. To this end, the UE may establish synchronization with the eNB by receiving synchronization signals, e.g., a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization, and the SSS is used to acquire frame synchronization, a cell group ID, and/or CP configuration of a cell (i.e., information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, the PSS is transmitted on the last OFDM symbol of the first slot of subframe 0 and on the last OFDM symbol of the first slot of subframe 5, and the SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

The UE, which has determined time and frequency parameters necessary for performing demodulation of a DL signal and transmission of a UL signal at an accurate time by performing a cell search procedure using PSS/SSS, can communicate with the eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB17 in accordance with the parameters.

The MIB includes most frequently transmitted parameters which are essential for initial access of the UE to a network of the eNB. The UE may receive the MIB through a broadcast channel (e.g., PBCH). The MIB includes a DL bandwidth (BW), PHICH configuration, and a system frame number (SFN). Accordingly, the UE may be explicitly aware of information about the DL BW, SFN, and PHICH configuration by receiving the PBCH. Meanwhile, information which may be implicitly recognized by the UE through reception of the PBCH includes the number of transmitting antenna ports of the eNB. Information about the number of transmitting antennas of the eNB is implicitly signaled by masking (e.g. XOR operation) a sequence corresponding to the number of transmitting antennas to a 16-bit cyclic redundancy check (CRC) used for error detection of the PBCH.

The SIB1 includes parameters needed to determine if a specific cell is suitable for cell selection, as well as information about time-domain scheduling of the other SIBs. The SIB1 is received by the UE through broadcast signaling or dedicated signaling.

DL carrier frequency and corresponding system bandwidth may be acquired by the MIB carried by the PBCH. UL carrier frequency and corresponding system bandwidth may be acquired by system information which is a DL signal. The UE which has received the MIB applies a DL BW value within the MIB to a UL-bandwidth (UL BW) until system information block type 2 (SystemInformationBlockType2, SIB2) is received if there is no valid system information stored in a corresponding cell. For example, the UE may identify a full UL system band, which may be used by itself for UL transmission, through UL-carrier frequency and UL-bandwidth information within the SIB2 by acquiring system information block type 2 (SystemInformationBlockType2, SIB2).

In the frequency domain, a PSS/SSS and a PBCH are transmitted only in a total of 6 RBs, i.e., a total of 72 subcarriers, irrespective of actual system BW, wherein 3 RBs are in the left and the other 3 RBs are in the right centering on a DC subcarrier within corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

Figure 4:
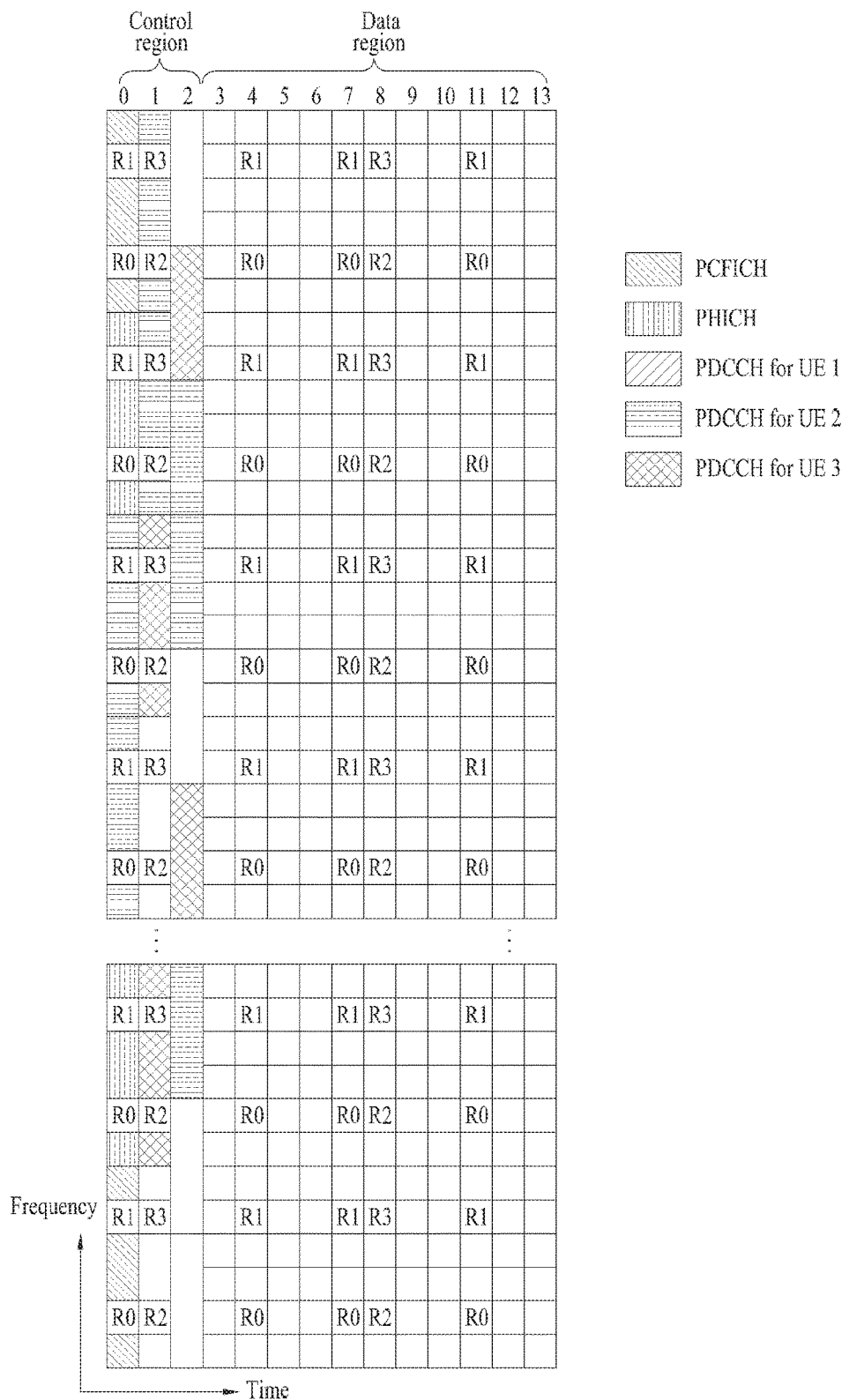
FIG. 4 illustrates a DL subframe structure used in a wireless communication system.

FIG. 4 illustrates an example of a DL subframe structure used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. A structure of the REG will be described in more detail with reference to FIG. 5.

A set of OFDM symbols available for the PDCCH at a subframe is given by the following Table.

TABLE 3

| Subframe | Number of OFDM symbols for PDCCH when NDLRB > 10 | Number of OFDM symbols for PDCCH when NDLRB ≤ 10 |
| --- | --- | --- |
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth NDLRB>10, the number 1, 2 or 3 of OFDM symbols which are spans of DCI carried by the CFI is given by the PDCCH. For a downlink system bandwidth NDLRB the number 2, 3 or 4 of OFDM symbols which are spans of DCI carried by the PDCCH is given by CFI+1. The CFI is coded in accordance with the following Table.

TABLE 4

| CFI | CFI code word <b0, b1, . . . , b31> |
| --- | --- |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread by a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) is referred to as DL scheduling information or DL grant. Transmit format and resource allocation information of an uplink shared channel (UL-SCH) is referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), and precoding matrix indicator (PMI) information is transmitted to the UE as the DCI. The following table shows examples of DCI formats.

TABLE 5

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |

TABLE 5-continued

| DCI format | Description |
|---|---|
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is allocated to first m number of OFDM symbol(s) within a subframe. In this case, m is an integer of 1 or more, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in the system may be numbered from 0 to NCCE−1, wherein NCCE=floor (NREG/9), and NREG denotes the number of REGs which are not allocated to the PCFICH or the PHICH.

The number of DCI formats and DCI bits are determined in accordance with the number of CCEs. The CCEs are numbered and consecutively used. To simplify the decoding process, a PDCCH having a format including n CCEs may be initiated from only CCEs having numbers corresponding to multiples of n. The number of CCEs used for transmission of a specific PDCCH is determined by a network or the eNB in accordance with a channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

The eNB transmits an actual PDCCH (DCI) on a PDCCH candidate in a search space, and the UE monitors the search space to detect the PDCCH (DCI). In this case, monitoring implies attempting to decode each PDCCH in the corresponding search space in accordance with all monitored DCI formats. The UE may detect its PDCCH by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected. This process is referred to as blind detection (or blind decoding (BD)).

For example, it is assumed that a specific PDCCH is CRC-masked with a radio network temporary identity (RNTI) 'A' and information about data transmitted using a radio resource 'B' (e.g., frequency location) and using transport format information 'C' (e.g., transmission block size, modulation scheme, coding information, etc.) is transmitted in a specific DL subframe. Then, the UE monitors the PDCCH using RNTI information thereof. The UE having the RNTI 'A' detects the PDCCH and receives the PDSCH indicated by 'B' and 'C' through information of the received PDCCH.

FIG. 5 illustrates a resource unit used to configure a downlink control channel.

FIG. 5($a$) illustrates that the number of Tx antennas is 1 or 2, and FIG. 5($b$) illustrates that the number of Tx antennas is 4. Resource units related to a control channel are configured in the same manner, although a different CRS pattern is used according to the number of Tx antennas. Referring to FIG. 5, a resource unit for a control channel is an REG. The REG includes four adjacent REs except for CRSs. That is, the REG includes the other REs except RE marked with any one of R0 to R3 in FIG. 5. A PFICH and a PHICH include 4 REGs and 3 REGs, respectively. A PDCCH is configured in a unit of CCEs, each CCE including 9 REGs. Although REGs configuring CCE are illustrated as being adjacent to one another in FIG. 5, 9 REGs configuring CCE may be distributed on a frequency axis and/or time axis in a control region.

Figure 6:
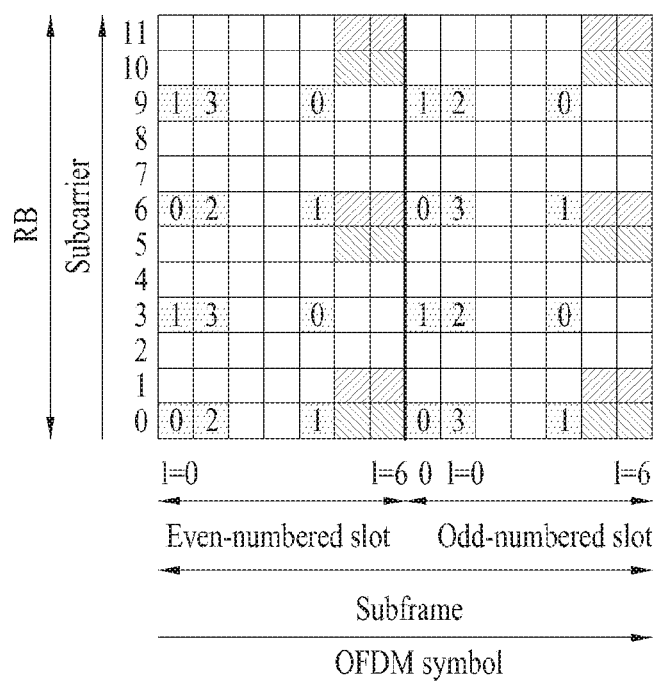
FIG. 6 illustrates an example of a cell specific reference signal (CRS) and a UE specific reference signal (UE-RS)

FIG. 6 illustrates cell specific reference signals (CRSs) and user specific reference signals (UE-RS). In particular, FIG. 6 shows REs occupied by the CRS(s) and UE-RS(s) on an RB pair of a subframe having a normal CP.

In the legacy 3GPP system, since CRSs are used for both demodulation and measurement, the CRSs are transmitted over a full downlink bandwidth in all DL subframes in a cell supporting PDSCH transmission and are transmitted through all antenna ports configured for an eNB.

Referring to FIG. 6, the CRSs are transmitted through antenna ports p=0, p=0, 1, and p=0, 1, 2, 3 in accordance with the number of antenna ports of a transmission mode. The CRSs are fixed at a certain pattern within a subframe regardless of a control region and a data region. A control channel is allocated to a resource of the control region, to which no CRS is allocated, and a data channel is also allocated to a resource of the data region, to which no CRS is allocated.

A UE may measure CSI using the CRSs and demodulate a signal received on a PDSCH in a subframe including the CRSs. That is, the eNB transmits the CRSs at predetermined locations of each RB in all RBs and the UE performs channel estimation based on the CRSs and then detects the PDSCH. For example, the UE may measure a signal received in a CRS RE and detect a PDSCH signal from an RE to which the PDSCH is mapped, using the measured signal and using the ratio of reception energy per CRS RE to reception energy per PDSCH mapped RE. However, when the PDSCH is transmitted based on the CRSs, since the eNB should transmit the CRSs with respect to all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS may be a kind of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs in terms of usage.

Referring to FIG. 6, the UE-RS is supported for transmission of PDSCH, and is transmitted through antenna port(s) p=5, p=7, p=8 or p=7, 8, . . . , u+6 (where, u is the number of layers used for the PDSCH transmission). The UE-RS is present and is a valid reference for PDSCH demodulation only if the PDSCH transmission is associated with the corresponding antenna port. The UE-RS is transmitted only on RBs to which the corresponding PDSCH is mapped. That is, the UE-RS is configured to be transmitted only on RB(s) to which a PDSCH is mapped at a subframe in which the PDSCH is scheduled unlike CRSs configured to be transmitted every subframe irrespective of the presence of the PDSCH. Accordingly, overhead of the RS may be lowered compared to that of the CRS.

Meanwhile, the CSI-RS is a DL RS introduced in the 3GPP LTE-A system for the purpose of channel measurement. In the 3GPP LTE-A system, a plurality of CSI-RS configurations are defined for CSI-RS transmission.

Figure 7:
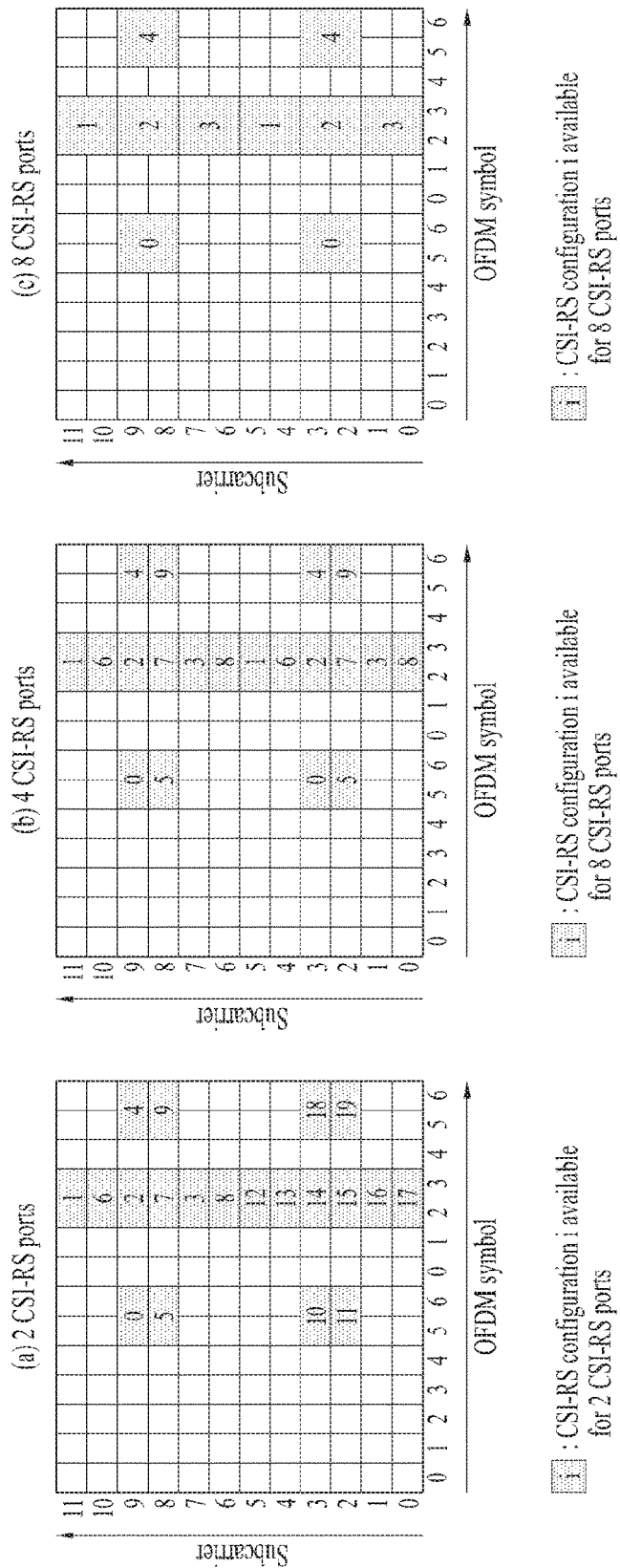
FIG. 7 illustrates an example of channel state information reference signal (CSI-RS) configurations.

FIG. 7 illustrates an example of channel state information reference signal (CSI-RS) configurations. Particularly, FIG. 7(a) illustrates 20 CSI-RS configurations 0 to 19 available for CSI-RS transmission through one or two CSI-RS ports among the CSI-RS configurations, FIG. 7(b) illustrates 10 available CSI-RS configurations 0 to 9 through four CSI-RS ports among the CSI-RS configurations, and FIG. 7(c) illustrates 5 available CSI-RS configurations 0 to 4 through 8 CSI-RS ports among the CSI-RS configurations. The CSI-RS ports refer to antenna ports configured for CSI-RS transmission. For example, antenna ports 15 to 22 correspond to the CSI-RS ports. Since CSI-RS configuration differs depending on the number of CSI-RS ports, if the number of antenna ports configured for CSI-RS transmission differs, the same CSI-RS configuration number may correspond to different CSI-RS configurations.

Unlike the CRS configured to be transmitted every subframe, the CSI-RS is configured to be transmitted at a predetermined transmission period corresponding to a plurality of subframes. Accordingly, CSI-RS configurations vary not only with the locations of REs occupied by CSI-RSs in an RB pair according to Table 8 or Table 9 but also with subframes in which CSI-RSs are configured. That is, if subframes for CSI-RS transmission differ even when CSI-RS configuration numbers are the same, CSI-RS configurations also differ. For example, if CSI-RS transmission periods $T_{CSI-RS}$ differ or if starting subframes $\Delta_{CSI-RS}$ in which CSI-RS transmission is configured in one radio frame differ, this may be considered as different CSI-RS configurations. Hereinafter, in order to distinguish between a CSI-RS configuration to which a CSI-RS configuration number is given and a CSI-RS configuration varied depending on a CSI-RS configuration number, the number of CSI-RS ports, and/or a CSI-RS configured subframe, the latter CSI-RS configuration will be referred to as a CSI-RS resource configuration.

When informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback Pc, a zero-power CSI-RS configuration list, a zero-power CSI-RS subframe configuration, etc.

The CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows the CSI-RS subframe configuration $I_{CSI-RS}$ according to $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying $\{10 \, n_f + \text{floor}(n_s/2) - \Delta_{CSI-RS}\} \, \text{mod} \, T_{CSI-RS} = 0$ (where, $n_f$ is a radio frame number and $n_s$ is a slot number within a radio frame) are subframes including CSI-RSs.

Pc is a ratio of PDSCH EPRE to CSI-RS EPRE assumed by the UE when the UE derives CSI for CSI feedback. EPRE means energy per resource element. The CSI-RS EPRE means energy per RE occupied by the CSI-RS, and PDSCH EPRE means energy occupied by the PDSCH.

The zero-power CSI-RS configuration list denotes CSI-RS pattern(s) in which the UE should assume zero transmission power. For example, since the eNB will transmit signals at zero transmission power on REs included in CSI-RS configurations indicated as zero transmission power in the zero power CSI-RS configuration list, the UE may assume signals received on the corresponding REs as interference or decode DL signals except for the signals received on the corresponding REs. The zero power CSI-RS configuration list may be a 16-bit bitmap corresponding one by one to 16 CSI-RS patterns for four antenna ports. In the 16-bit bitmap, the most significant bit corresponds to a CSI-RS configuration of the lowest CSI-RS configuration number (or, called a CSI-RS configuration index) and subsequent bits correspond to CSI-RS patterns in an ascending order. The UE assumes zero transmission power with respect to REs of a CSI-RS pattern corresponding to bit(s) set to '1' in the 16-bit zero power CSI-RS bitmap configured by a higher layer. Hereinafter, a CSI-RS pattern in which the UE should assume zero transmission power will be referred to as a zero power CSI-RS pattern.

A zero power CSI-RS subframe configuration is information for specifying subframes including the zero power CSI-RS pattern. Like the CSI-RS subframe configuration, a subframe including the presence of the zero power CSI-RS may be configured for the UE by using $I_{CSI-RS}$ according to Table 6. The UE may assume that subframes satisfying $\{10 \, n_f + \text{floor}(n_s/2) - \Delta_{CSI-RS}\} \, \text{mod} \, T_{CSI-RS} = 0$ include the zero power CSI-RS pattern. $I_{CSI-RS}$ may be separately configured with respect to a CSI-RS pattern in which the UE should assume non-zero transmission power and a zero power CSI-RS pattern in which the UE should assume zero transmission power, on REs.

The UE configured for a transmission mode (e.g., transmission mode 9 or other newly defined transmission modes) according to the 3GPP LTE-A system may perform channel measurement using a CSI-RS and demodulate or decode a PDSCH using a UE-RS.

Figure 8:
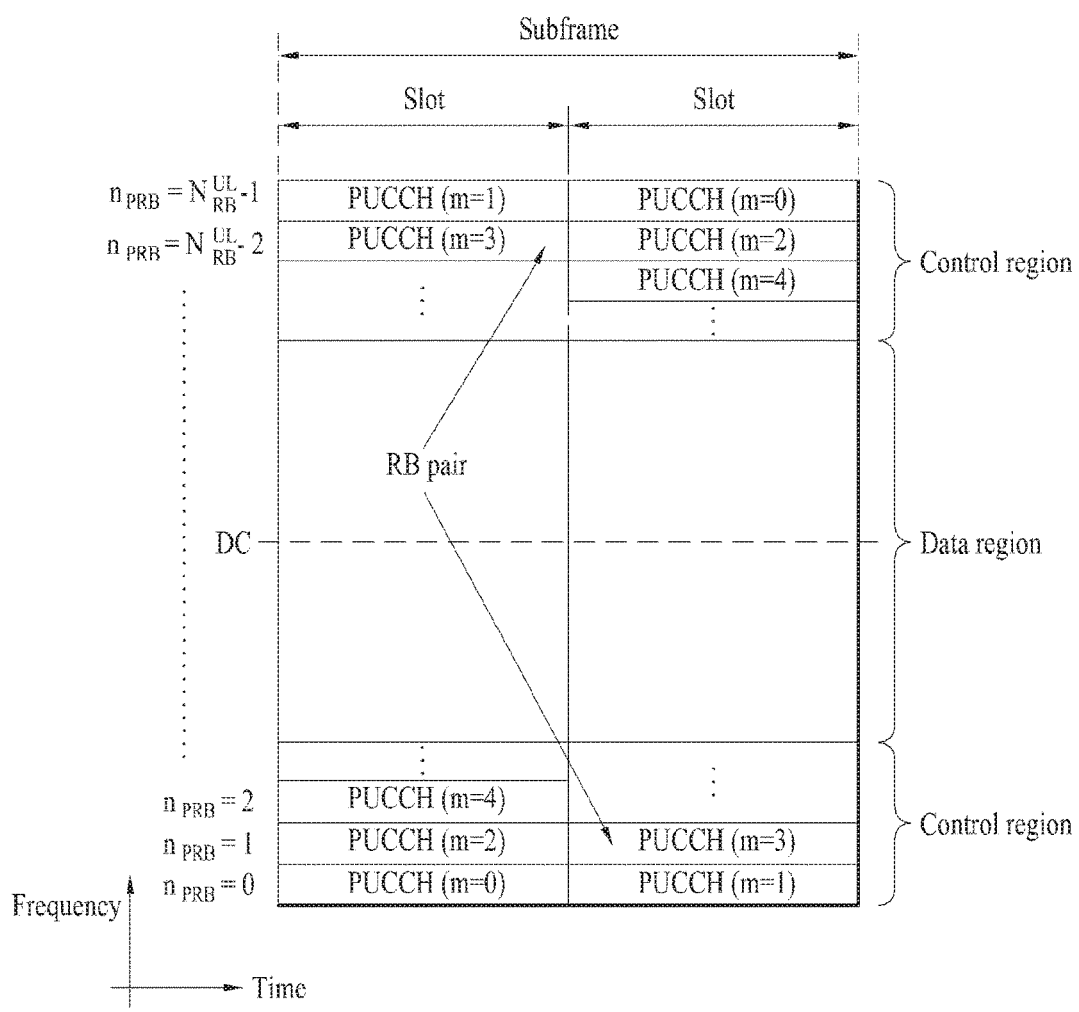
FIG. 8 illustrates a UL subframe structure used in a wireless communication system.

FIG. 8 illustrates an example of a UL subframe structure used in a wireless communication system.

Referring to FIG. 8, a UL subframe may be divided into a data region and a control region in the frequency domain. One or several PUCCHs may be allocated to the control region to carry uplink control information (UCI). One or several PUSCHs may be allocated to the data region of the UL subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency f0 in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g., a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. In this case, HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that may be received by the UE through the same time-frequency resource. The PMI is a value reflecting a space characteristic of a channel and indicates an index of a UE's preferred precoding matrix for DL signal transmission based on a metric such as an SINR. The CQI is a value of channel strength, and indicates a received SINR that may be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a predetermined radio frame into a UL time unit and a DL time unit in the time domain and then performs data transmission/reception through the UL/DL time unit (in case of a time division duplex (TDD) mode). Recently, to use a wider frequency band in recent wireless communication systems, the introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinafter, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be determined independently. Also, asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured for the UE or deactivate some of the serving cells for communication with the UE. The eNB may change the activated/deactivated cell(s), and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell, in which carrier aggregation is performed for a UE based on measurement report from another eNB or UE, among cells of an eNB and is configured per UE. The cell configured for the UE may be a serving cell in terms of the corresponding UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE, and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time−1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted from one cell. In other words, in case of FDD under a single carrier status, a PDCCH for a DL grant for a PDSCH, which will be transmitted from a specific DL CC, is transmitted from the specific CC, and a PDSCH for a UL grant for a PUSCH, which will be transmitted from a specific UL CC, is transmitted from a DL CC linked to the specific UL CC. In case of TDD under a single carrier status, a PDCCH for a DL grant for a PDSCH, which will be transmitted from a specific DL CC, is transmitted from the specific CC, and a PDSCH for a UL grant for a PUSCH, which will be transmitted from a specific UL CC, is transmitted from the specific CC.

On the contrary, since a plurality of serving cells may be configured in a multi-carrier system, transmission of UL/DL grant from a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted to a DL CC A, and a corresponding PDSCH may be transmitted to the DL CC B or DL CC C. For cross-CC scheduling, a carrier indicator field (CIF) may be introduced. The presence or absence of the CIF within the PDCCH may be configured semi-statically and UE-specifically (or UE-group-specifically) by higher layer signaling (e.g., RRC signaling).

Figure 9:
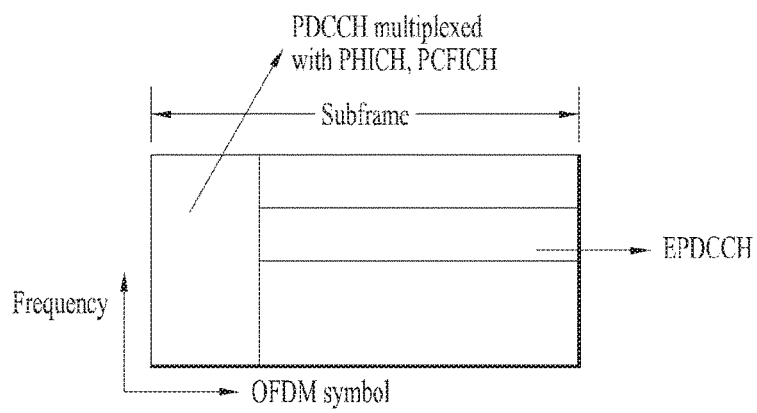
FIG. 9 illustrates a downlink control channel configured in a data region of a downlink subframe.

FIG. 9 illustrates a downlink control channel configured in a data region of a downlink subframe.

Meanwhile, if RRH technology, cross-carrier scheduling technology, etc. are introduced, the amount of PDCCH which should be transmitted by the eNB is gradually increased. However, since a size of a control region to which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured for rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE may decode/demodulate the PDCCH based on the CRS and decode/demodulate the EPDCCH based on the DMRS. The DMRS associated with EPDCCH is transmitted on the same antenna port p$\varepsilon${$107,108,109,110$} as the EPDCCH physical resource, is present for EPDCCH demodulation only if the EPDCCH is associated with the corresponding antenna port, and is transmitted only on the PRB(s) to which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling may configure a UE with one or two EPDCCH-PRB-sets for EPDCCH monitoring. The PRB-pairs corresponding to an EPDCCH-PRB-set are indicated by higher layers. Each EPDCCH-PRB-set consists of a set of ECCEs numbered from 0 to NECCE,p,k−1, where NECCE,p,k is the number of ECCEs in EPDCCH-PRB-set p of subframe k. Each EPDCCH-PRB-set may be configured for either localized EPDCCH transmission or distributed EPDCCH transmission.

The UE monitors a set of EPDCCH candidates on one or more activated serving cells as configured by higher layer signaling for control information.

The set of EPDCCH candidates to be monitored are defined in terms of EPDCCH UE-specific search spaces. For each serving cell, the subframes in which the UE monitors EPDCCH UE-specific search spaces are configured by higher layers.

The UE does not monitor the EPDCCH at the following subframes:
- special subframes for special subframe configurations 0 and 5 of Table 2 in case of TDD and normal downlink CP;
- subframes for special subframe configurations 0, 4 and 7 of Table 2 in case of TDD and extended downlink CP;
- subframes indicated to decode a physical multicast channel (PMCH) by higher layer;
- the same downlink subframe on the Scell when a downlink subframe on the Pcell is a special subframe and the UE cannot perform simultaneous transmission and reception on the Pcell and Scell if the UE is configured by UL/DL configurations for the Pcell and Scell.

An EPDCCH UE-specific search space ES(L)k at aggregation level L∈{1,2,4,8,16,32} is defined by a set of EPDCCH candidates. For an EPDCCH-PRB-set p configured for distributed transmission, ECCEs corresponding to EPDCCH candidate m of the search space ES(L)k are given by the following equation.

Equation 1

$$L\{(Y_{p,k}+m') \bmod \lfloor N_{ECCE,p,k}/L \rfloor\}+i \quad \text{[Equation 1]}$$

For an EPDCCH-PRB-set p configured for distributed transmission, ECCEs corresponding to EPDCCH candidate m of the search space ES(L)k are given by the following equation.

Equation 2

$$L\left\{\left(Y_{p,k}+\left\lfloor\frac{m \cdot N_{ECCE,p,k}}{L \cdot M_p^{(L)}}\right\rfloor+b\right) \bmod \lfloor N_{ECCE,p,k}/L\rfloor\right\}+i \quad \text{[Equation 2]}$$

In this case, i=0, . . . , L−1. b=nCI if the UE is configured with a carrier indicator field for the serving cell on which EPDCCH is monitored, otherwise b=0. nCI is a carrier indicator field (CIF) value, which is the same as a serving cell index (ServCellIndex). m=0, 1, . . . , M(L)p−1, M(L)p is the number of EPDCCH candidates to be monitored at aggregation level L in EPDDCH-PRB-set p. The variable Yp,k is defined by 'Yp,k=(Ap·Yp,k−1) mod D', where Yp,k−1=nRNTI≠0, A0=39827, A0=39829, D=65537 and k=floor(ns/2). ns is the slot number within a radio frame.

The UE does not monitor the EPDCCH candidate, if an ECCE corresponding to the EPDCCH candidate is mapped to a PRB pair that overlaps in frequency with a transmission of either PBCH or PSS/SSS at the same subframe.

The EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to REs. There are 16 REGs, numbered from 0 to 15, per physical resource block (PRB) pair comprised of PRB within a first slot of one subframe and PRB within a second slot thereof. Among REs within the PRB pair, the other REs except REs carrying DMRS (hereinafter, EPDCCH DMRS) for demodulation of the EPDCCH are numbered in an increasing order of frequency and then numbered cyclically from 0 to 15 in an increasing order of time. Then, all the REs, except the REs carrying the EPDCCH DMRS, in the PRB pair have any one of numbers 0 to 15. All REs with the same number i in the PRB pair constitute EREG number i. As described above, it is noted that EREGs are distributed on frequency and time axes within the PRB pair and EPDCCHs transmitted using aggregation of one or more ECCEs, each of which includes a plurality of EREGs, are also located by being distributed on frequency and time axes within the PRB pair.

The number of ECCEs used for one EPDCCH depends on the EPDCCH format as given by Table 7, and the number of EREGs per ECCE is given by Table 8. Table 7 shows an example of supported EPDCCH formats, and Table 8 shows an example of the number NEREGECCE of EREGs per ECCE. Both localized transmission and distributed transmission are supported.

TABLE 7

| | Number of ECCEs for one EPDCCH, NECCEEPDCCH | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 8

| Normal cyclic prefix | | | Extended cyclic prefix | |
|---|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

The EPDCCH may use either localized or distributed transmission, which differ depending on mapping of ECCEs to EREGs and PRB pairs. One or two sets of PRB pairs, in which the UE monitors EPDCCH transmission, may be configured. All EPDCCH candidates in EPDCCH set Sp (i.e., EPDCCH-PRB-set) use either only localized transmission or only distributed transmission as configured by higher layers. Within EPDCCH set Sp at subframe k, the ECCEs available for transmission of EPDCCHs are numbered from 0 to NECCE,p,k−1. ECCE number n corresponds to the following EREG(s):

EREGs numbered with (n mod NECCERB)+jNECCERB in PRB index floor(n/NECCERB) for localized mapping; and EREGs numbered in PRB indexes (n+jmax(1,NSpRB/NEREGECCE))modNSpRB for distributed mapping, where j=0, 1, . . . , NEREGECCE−1, NEREGECCE is the number of EREGs per ECCE, and NECCERB=16/NEREGECCE is the number of ECCEs per RB pair. The PRB pairs constituting EPDCCH set Sp are assumed to be numbered in ascending order from 0 to NSpRB−1.

Case A in Table 7 applies when:

DCI format 2, 2A, 2B, 2C or 2D is used and NDLRB≥25, or any DCI format when nEPDCCH<104 and normal cyclic prefix is used at normal subframes or special subframes with special subframe configurations 3, 4, and 8.

Otherwise Case B is used. The quantity nEPDCCH for a specific UE is defined as the number of downlink resource elements (k,l), which fulfill all of the following criteria, in a PRB pair configured for possible EPDCCH transmission of EPDCCH set S0, they are part of any one of the 16 EREGs in the physical resource-block pair, they are assumed by the UE not to be used for CRSs or CSI-RSs, the index l fulfilling l≥lEPDCCHStart in a subframe, where lEPDCCHStart is given based on higher layer signaling 'epdcch-StartSymbol-r11', higher layer signaling 'pdsch-Start-r11', or CFI value carried by PCFICH.

The mapping of resource elements (k,l), which fulfil the criteria above, to antenna port p is in increasing order of the index k and then the index l, starting from the first slot and ending with the second slot in a subframe.

For localized transmission, the single antenna port p to be used is given by n'=nECCE,lowmodNECCERB+nRNTI-modmin(NECCEEPDCCH,NECCERB) and Table 9, where nECCE is the lowest ECCE index used by this EPDCCH transmission in the EPDCCH set, nRNTI corresponds to the RNTI associated with the EPDCCH transmission, and NECCEEPDCCH is the number of ECCEs used for the EPDCCH.

TABLE 9

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner, where the antenna ports p∈{107,109} for normal cyclic prefix and the antenna ports p∈{107,108} for extended cyclic prefix.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) in accordance with a data transmission rate. Since the MTC UE has low mobility, the channel environment thereof remains substantially the same. If the MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has a difficulty in receiving the PDCCH, the PDSCH, etc. Therefore, the present invention proposes that the eNB apply a coverage enhancement scheme such as subframe repetition (repetition of a subframe with a signal) or subframe bundling when transmitting a signal to the MTC UE having a coverage issue so that the MTC UE may effectively receive the signal transmitted from the eNB. For example, the PDCCH and PDSCH may be transmitted to the MTC UE having the coverage issue through a plurality of subframes (e.g., about 100 subframes).

Since the embodiments of the present invention described hereinafter relate to methods for coverage enhancement, the embodiments may be applied to another UE having a coverage issue as well as the MTC UE. Therefore, the embodiments of the present invention may be applied to a UE operating in a coverage enhancement mode. However, for convenience of description, a UE implemented to carry out the coverage enhancement method according to the present invention will be referred to as an MTC UE, and a UE which is not implemented to carry out the coverage enhancement method according to the present invention will be referred to a legacy UE.

Figure 10:
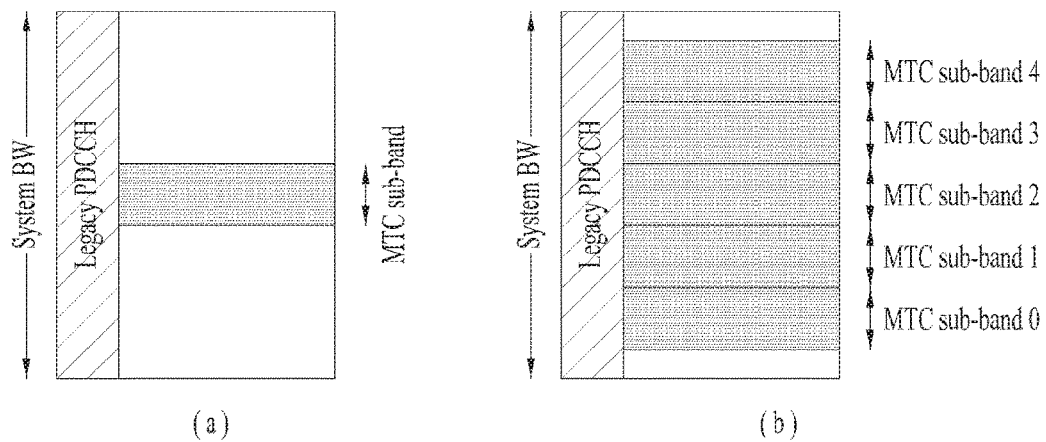
FIG. 10 illustrates an example of a signal band for MTC.

FIG. 10 illustrates an example of a signal band for MTC.

As one method for reducing the cost of the MTC UE, an operation of the MTC UE may be performed at a reduced UE downlink and uplink bandwidth of 1.4 MHz, for example, regardless of an operating system bandwidth of a cell. At this time, a sub-band for operating the MTC UE may always be located at the center (e.g., 6 center PRBs) of a cell as shown in FIG. 10(a), or several subbands for MTC may be provided for one subframe to multiplex MTC UEs as shown in FIG. 10(b), whereby the UEs may use their respective subbands different from each other or the UEs use the same subband not the subband of 6 center PRBs.

In this case, the MTC UE cannot receive a legacy PDCCH transmitted through a full system band normally, and transmission of PDCCH for the MTC UE from an OFDM symbol region from which the legacy PDCCH is transmitted may not be preferable due to multiplexing issue with a PDCCH transmitted to another UE. As one method for solving this, it is required to introduce a control channel transmitted within a subband where MTC is operated for the MTC UE. As a downlink control channel for such a low-complexity MTC UE, the legacy EPDCCH may be used as it is. Or, M-PDCCH for the MTC UE, which is a control channel of a modified type of the legacy PDCCH/EPDCCH, may be introduced.

Hereinafter, in the present invention, a physical downlink control channel for the low-complexity MTC UE or normal complexity MTC UE will be referred to as EPDCCH, M-PDCCH, or MTC-PDCCH. In other words, EPDCCH, M-PDCCH and MTC-PDCCH are together used as terms indicating a physical downlink control channel transmitted in a data region of a subframe for low-complexity MTC UE or normal (MTC) UE.

Although the present invention describes that a downlink control channel is assumed to be used for an MTC UE as suggested, the suggested downlink control channel may be used for another normal UE not the MTC UE. Also, MTC-EPDCCH is hereinafter used to refer to M-PDCCH.

Unlike the legacy PDCCH transmitted in an OFDM symbol(s) located at the front part of a subframe, the EPDCCH according to the present invention can be transmitted in the remaining OFDM symbols except the OFDM symbol(s) used for transmission of the PDCCH(s). In this case, a start OFDM symbol used for the EPDCCH transmission may be an OFDM symbol next to a last OFDM symbol used for the PDCCH transmission or not. Thus, information indicating the OFDM symbol where the EPDCCH transmission is initiated in the subframe needs to be provided to a UE. To this end, the following alternatives can be taken into consideration.

Alternative 1: Signaling in MIB

A CFI value for the low-complexity UE, i.e., information indicating the start OFDM symbol of the EPDCCH and/or PDSCH can be signaled through the MIB. The MIB is 24 bits of information and among the 24 bits, 10 bits are reserved for future use. To signal a cell-specific CFI value simply, it may be considered that the CFI value for the low-complexity UE is included in the MIB. However, it may not be desirable to transmit information through the MIB only for some UEs, e.g., low-complexity/low-cost UE, rather than all the UEs supported within the cell.

Alternative 2: Signaling in SIB

The CFI value for the low-complexity UE can be signaled in the SIB. In this case, there should be a fixed CFI value for at least part of SIB transmission. Thus, there could be two different CFI values: one is for part of SIB transmission and the other one is for the PDCCH and other PDSCHs. In this case, the UE may be required to perform a different operation to receive the SIB and other PDSCHs and thus, resources for EPDCCH and PDSCH transmission may be increased compared to alternative 3.

Alternative 3: Fixed CFI Value for all Subframes

The simplest method would be to fix the CFI value for the low-complexity UE. However, in this case, the CFI value should be set to the maximum one among available CFI values, so resource waste may occur when a cell serving the low-complexity UE uses smaller number of OFDM symbols than the fixed CFI value for legacy PDCCH transmission. In the case of a low-complexity UE that requires or performs coverage enhancement (hereinafter referred to as an enhanced-coverage low-complexity UE or enhanced coverage UE), it needs to be considered that a sufficient amount of resources are required to reduce the number of repetitions for PDCCH and PDSCH transmission.

For CFI signaling considering configurability of a cell-specific CFI value, the alternative 2 is preferred than the alternative 1. Since it is not desirable to use the reserved bits in the MIB for the low-complexity UE, the alternative 3 is more considerable than the alternative 1.

Meanwhile, a common search space (CSS) can be used to transmit a UE-specific PDSCH such as RRC signaling for the low-complexity UE (e.g., EPDCCH configuration for CSS and/or USS (hereinafter, CSS/USS)) in addition to broadcast PDSCH transmission. If a coverage enhancement level required for a UE can be changed due to channel environment variation or UE mobility, the coverage enhancement level can be configured or reconfigured by the RRC signaling. Considering this, the PDSCH including the RRC signaling should be transmitted using the highest coverage enhancement level supported within the cell. The reason for this is as follows. For example, if a higher coverage enhancement level is required due to a poor channel state of the UE, an eNB can transmit a message for reconfiguring the coverage enhancement level with reference to the number of repetitions in accordance with the previous coverage enhancement level. However, the UE may not correctly receive the reconfiguration message due to the poor channel state. Therefore, there could be at least two different repetition levels for unicast PDSCH transmission. This is because data for reconfiguring the coverage enhancement level may require the number of repetitions different from that according to the previous coverage enhancement level. Considering design complexity, the PDSCH transmitted using the highest coverage enhancement level can be transmitted through the CSS.

When a CFI value indicating an OFDM symbol where a UE can start control/data reception for a low-complexity UE and/or an EPDCCH configuration for CSS/USS are transmitted in an SIB, the UE may not receive another data while receiving an SIB update or before receiving the SIB update. When the CFI value is reconfigured by the SIB, the UE is unable to know the changed CFI value until receiving the SIB. In addition, when the UE does not know the changed CIF value, the UE may not receive an EPDCCH/PDSCH because the UE does not know a start OFDM symbol of the EPDCCH/PDSCH.

<A. Updated SIB Reception>

Figure 11:
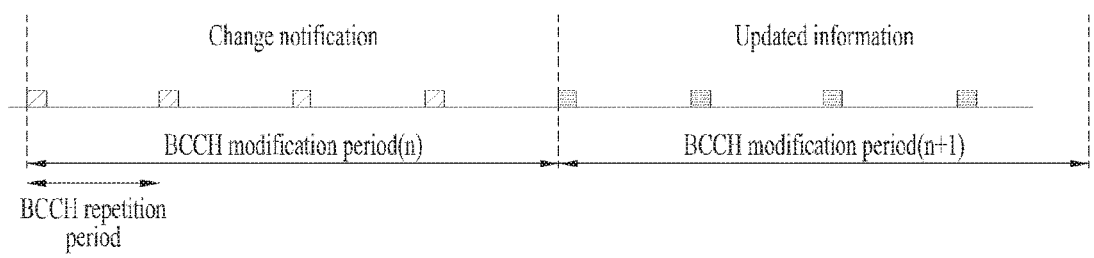
FIG. 11 illustrates a method of updating a system information block (SIB).

FIG. 11 illustrates a method of updating an SIB.

Subframes capable of transmitting SIBs are determined in advance. In addition, a UE decodes DCI masked with an SI-RNTI in a subframe where an SIB is expected to exist (hereinafter referred to as an SIB subframe) in order to determine whether the SIB actually exists in the corresponding SIB subframe. In the conventional LTE system, transmission of an updated SIB is performed as follows.

Change of system information occurs only at specific radio frames and to this end, the concept of a modification period is used. The same content of system information may be transmitted a number of times within a modification period as defined by scheduling of the system information. Boundaries of the modification period is defined by a system frame number (SFN) value for which SFN mod m=0, where m is the number of radio frames including the modification period. The modification period is configured by the system information. For example, the value of m can be determined by the system information. When an eNB changes (some of) the system information, the eNB notifies UEs of the change of the system information during the modification period. Thereafter, the eNB transmits the changed system information in a next modification period. Upon receiving a change notification, a UE can immediately obtain the new system information from the start of the next modification period.

Until the UE obtains the new system information, the UE applies the previously obtained system information.

For example, referred to FIG. 11, an eNB notifies a UE that an SIB will be updated through a paging message in a broadcast control channel (BCCH) modification period (n). Thereafter, the eNB transmits the updated SIB in a next BCCH modification period, i.e., a BCCH modification period (n+1). In a system information (SI) modification period, the same BCCH information may be transmitted a number of times as defined by scheduling (which is based on a repetition period). The updated SIB is applied from a start point of the BCCH modification period (i.e., SI modification period) or a random point thereof. As another example, the eNB may transmit the SIB update notification in some or all of the SIB subframes within the modification period (n) and then transmit the updated SIB in some or all of the SIB subframes within the next modification period (n+1). The UE attempts SIB reception in SIB subframes. However, since the UE does not know which SIB frames include the SIB, the UE may attempt to decode a PDCCH masked with an SI-RNTI until successfully receiving the SIB.

The paging message is used to notify a UE in the RRC_IDLE or RRC_CONNECTED state that the SI will be changed. If the UE receives the paging message containing the SI change notification, the UE may know that the SI will be changed at a boundary of the next modification period. If the UE does not receive any paging message within the SI modification period, the UE may assume that there will be no change in the SI at the boundary of the next modification period.

For the low-complexity UE, the CFI value and/or the EPDCCH configuration for the CSS/USS may be included in the SIB (which will be received by the low-complexity UE). In this case, the eNB may inform the UE that the SIB has been updated through the paging message as in the related art. Alternatively, the eNB may inform the SIB update through RRC signaling. The UE may monitor a paging channel or SIB1 to detect the SI change. For example, an 'SIB update' field containing information indicating that the SIB or SI has been updated can be transmitted to the UE through the paging message. Alternatively, it can be transmitted through an RRC signal in a UE-specific manner. In the present invention, SIB update information may include SIB update information transmitted to a UE through other pathways rather than the paging or RRC signal. In the SIB information, updates of the CFI value and/or the EPDCCH configuration for the CSS/USS may be informed through the paging or RRC signaling. For example, aside from the SIB update field, information (e.g., field) indicating that the CFI value and/or the EPDCCH configuration for the CSS/USS have been updated may be transmitted through the paging or RRC signaling. Alternatively, the information (field) indicating that the CFI value and/or the EPDCCH configuration for the CSS/USS have been updated may be included in the SIB update field.

Meanwhile, if the paging, the SIB, and the like are repeatedly transmitted for an enhanced-coverage low-complexity UE during a long period, the BCCH modification period may be significantly increased compared to the conventional one. Moreover, such a BCCH modification period may be greater than the time required for the enhanced-coverage low-complexity UE to read the SIB. The low-complexity UE or enhanced-coverage low-complexity UE has the following characteristics.

At least for the low-complexity UE, it is not required to support simultaneous reception of more than one transport block for unicast transmission in a single subframe. Here, the transport block refers to ones carried by the PDSCH.

At least for the low-complexity UE, it is not required to support simultaneous reception of a transport block for unicast transmission and a transport block for broadcast transmission in a single subframe. Here, the transport block refers to ones carried by the PDSCH.

At least for the enhanced-coverage low-complexity UE, it is not required to support simultaneous reception of multiple transport blocks for broadcast transmission (SIB/paging/RAR) in a single subframe. Here, the transport block refers to ones carried by the PDSCH.

For a low-complexity UE out of enhanced coverage (hereinafter referred to as normal-coverage low-complexity UE or normal coverage UE), it is not required to support simultaneous reception of multiple transport blocks for broadcast transmission (SIB/paging/RAR) in a single subframe. Here, the transport block refers to ones carried by the PDSCH.

When the SIB is updated, the UE cannot obtain information related to the updated SIB until receiving the updated SIB and thus, the UE may not correctly receive the EPDCCH, paging, RAR, and/or unicast PDSCH. For example, when the CFI value is changed, the UE cannot be aware of the changed CFI value until receiving the updated SIB and thus, the UE may not correctly receive the EPDCCH, PDSCH (except SIB), etc. As another example, when the EPDCCH configuration for the CSS/USS is changed, the UE cannot be aware of the changed EPDCCH configuration until receiving the updated SIB and thus, the UE may not correctly receive the EPDCCH on the CSS/USS.

Figure 12:
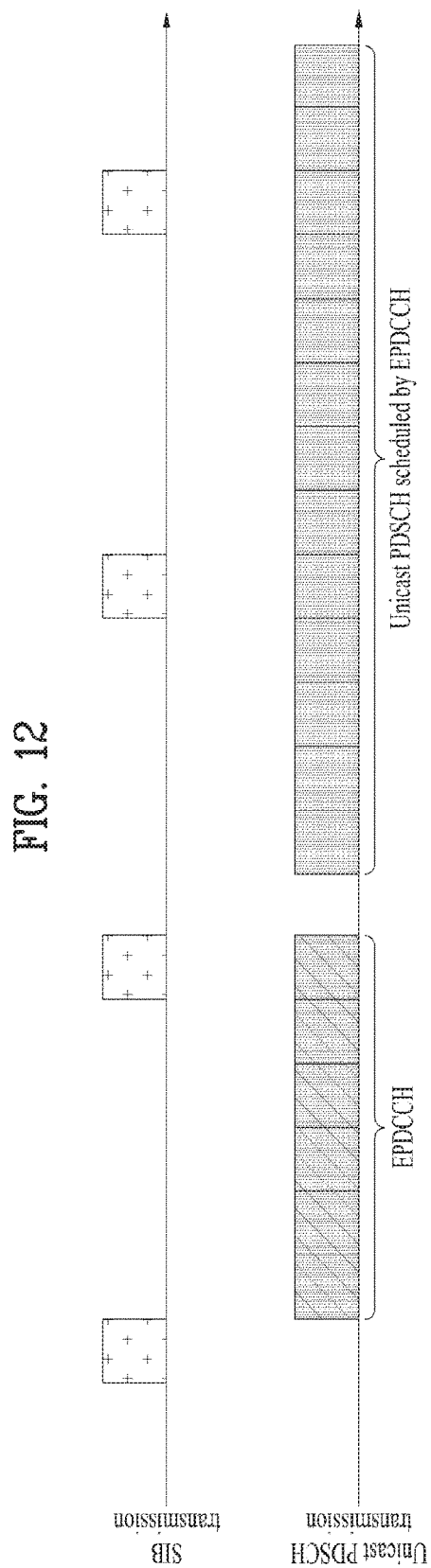
FIG. 12 illustrates a relationship between transmission of an enhanced physical downlink control channel (EPDCCH) and corresponding physical downlink shared channel (PDSCH) and transmission of system information (SI).

FIG. 12 illustrates a relationship between transmission of an EPDCCH and corresponding PDSCH and transmission of SI.

As shown in FIG. 12, if an SIB is repeatedly and periodically transmitted and the number of repetitions of the SIB, which is performed for a UE to successfully receive the SBI, is large, for example, 100, it may cause a serious problem that the UE does not correctly receive other data (e.g., EPDCCH and/or PDSCH) during a corresponding interval. Hereinafter, a description will be given of methods of solving the problem.

Method 1.

In general, a low-complexity UE can receive only one PDSCH or transport block in a single subframe. If an eNB notifies the low-complexity UE that an SIB has been updated (through a paging message, RRC signaling, etc.), the low-complexity UE can give higher priority to SIB reception than receiving other PDSCHs from a time when transmission of the updated SIB is initiated until a time when the low-complexity UE successfully receives the updated SIB. In other words, the UE may not receive other data such as broadcast data, unicast data, etc. until receiving the updated SIB. Alternatively, until receiving the updated SIB, the UE performs SIB reception in a subframe reserved for the SIB reception but may not receive other data such as broadcast data, unicast data. In other words, when the UE knows that the SIB will be updated, the UE gives the highest priority to receiving the updated SIB. By doing so, the UE can correctly receive an EPDCCH, paging, RAR, unicast PDSCH and the like, which will be transmitted using changed SIB information. Here, the changed SIB information may include, for example, a changed CFI value and EPDCCH configuration for CSS/USS.

Method 2.

The eNB may transmit data according to the previous SIB information i.e., the SIB information before the update until all low-complexity UEs will receive the updated SIB. Thus, the UEs can receive other channels such as the EPDCCH, PDSCH, etc. before or while receiving the updated SIB. To this end, the updated SIB information can be applied after elapse of a predetermined time after all the low-complexity UEs received the updated SIB.

Figure 13:
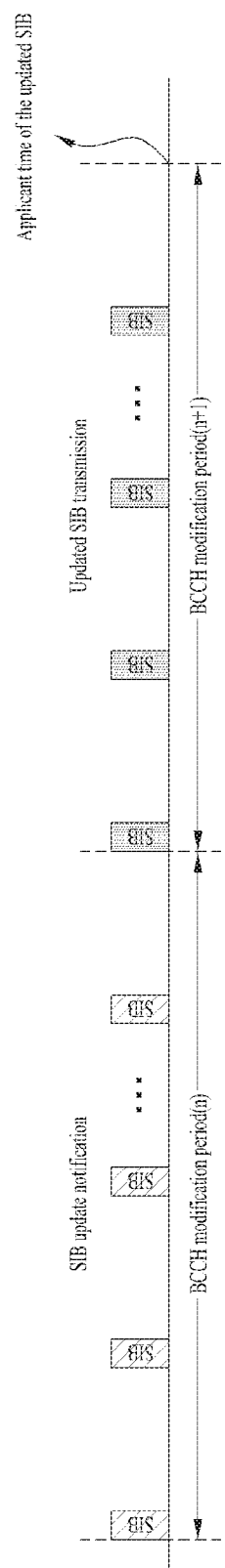
FIG. 13 illustrates an application time of updated SI according to an embodiment of the present invention.

FIG. 13 illustrates an application time of updated SI according to an embodiment of the present invention.

Referring to FIG. 13, an application time of updated SIB information may be a start point of a BCCH modification period (n+2) next to a BCCH modification period (n+1), where transmission of the updated SIB is performed or initiated. In other words, when a notification of the update of the SIB is transmitted in a BCCH modification period (n) and the transmission of the updated SIB is initiated from the BCCH modification period (n+1), a UE can assume that the updated SIB information is applied from the BCCH modification period (n+2).

However, when the method 2 is applied, UEs performing initial access to a cell may have a problem. In general, the BCCH modification period is configured through the SIB. According to the method 2, in case a value of the BCCH modification period is changed through the SIB, a length of the BCCH modification period where the updated SIB is initially transmitted is equal to that of the previous BCCH modification period, i.e., the BCCH modification period before the change, and a length of the next BCCH modification period is equal to that of the BCCH modification period changed by the updated SIB. For example, if a UE receives the SIB for the initial access in the BCCH modification period (n+1) corresponding to the BCCH modification period where the transmission of the updated SIB is initiated and the BCCH modification period is changed through the updated SIB, the UE cannot obtain information on the previous BCCH modification period and thus, the UE may not know when the received SIB information is applied. To overcome this problem, the following options can be considered.

Option 1.

When the updated SIB is transmitted, the BCCH modification period value before the update can be transmitted together. In this case, since the UE may not know whether the currently received SIB (or the BCCH modification period value therein) has been applied or will be applied, an indicator indicating whether the corresponding updated SIB has been applied or will be applied can be transmitted together with the updated SIB. Alternatively, the BCCH modification period before the update can be included only in the SIB transmitted before the updated SIB is applied. For example, both of the current BCCH modification period value and updated BCCH modification period value may be included in the SIB transmitted during the modification period (n+1), where the updated BCCH modification period value is not applied. In addition, only the current BCCH modification period value may be included in the SIB transmitted during the modification period n, where the current BCCH modification period value is applied. Further, only the updated BCCH modification period value may be included in the SIB transmitted during the modification period (n+2), where the updated BCCH modification period value is applied.

Option 2.

The BCCH modification period can be transmitted through an MIB. Alternatively, although the BCCH modification period is transmitted through the SIB, the UE can assume that the corresponding value is not changed.

The UEs performing the initial access to the cell may have another problem. That is, after receiving the SIB, the UEs may not perform PRACH transmission, EPDCCH reception, broadcast/unicast PDSCH reception, etc. until the start of the next BCCH modification. Considering that the BCCH modification period may be significantly increased for the enhanced coverage UE, this problem may cause great latency to a UE that receives the SIB at the beginning of the BCCH modification period. In particular, this problem may become more serious in the case of a low-complexity UE without coverage enhancement, i.e., a normal-coverage low-complexity UE, which does not require much time for the SIB reception. Thus, to solve the problem that the UE cannot perform other operations for the initial access until the next BCCH modification period, the following methods can be applied.

Method 3.

Due to change in the CFI by the updated SIB, a UE cannot receive the EPDCCH, PRACH, paging, unicast PDSCH, etc. until the start of the new BCCH modification period, i.e., the next BCCH modification period. To solve this, a CFI value before the update can be transmitted together with the updated SIB. That is, the CFI value before the update may be included in the updated SIB and then transmitted. In this case, since the UE cannot know whether the currently received SIB (the BCCH modification period value) has been applied or will be applied, it is possible to transmit the indicator indicating whether the corresponding updated SIB is currently applied or not. Alternatively, the CFI before the update can be included only in the SIB transmitted before the updated SIB is applied. For example, both of the current CFI and updated CFI may be included in the SIB transmitted during the modification period (n+1), where the updated SIB is not applied. In addition, only the current CFI may be included in the SIB transmitted during the modification period n, where the current CFI is applied. Further, only the updated CFI may be included in the SIB transmitted during the modification period (n+2), where the updated CFI is applied.

Method 4.

Due to changes by the updated SIB, a UE cannot receive the RAR until the start of the new BCCH modification period. To solve this, configurations (e.g., CFI value) for receiving Message 2 and/or Message 4, which will be received after PRACH transmission, contention-based PRACH transmission, or PRACH transmission in the initial access procedure, can be predetermined or fixed. In addition, configurations for receiving an EPDCCH for scheduling Message 2 and/or Message 4, which will be received after the PRACH transmission, contention-based PRACH transmission, or PRACH transmission in the initial access procedure, can also be predetermined or fixed.

Method 5.

The eNB may transmit data according to the previous SIB information i.e., the SIB information before the update until all low-complexity UEs will receive the updated SIB. Thus, the UEs can receive other channels such as the EPDCCH, PDSCH, etc. before or while receiving the updated SIB. To this end, the eNB can apply the updated SIB information after elapse of a predetermined time after all the low-complexity UEs received the updated SIB. In addition, the eNB can inform the application time of the updated SIB through the SIB. Particularly, the application time of the updated SIB can be transmitted only in the first BCCH modification period, where the updated SIB is transmitted. Alternatively, the application time of the updated SIB can be transmitted in each SIB transmission time. In addition, when the updated SIB is already applied, the application time of the updated SIB is set to 0 (or a specific value). Alternatively, indication indicating whether the updated SIB is applied or not can be transmitted together with the application time of the updated SIB.

When the method 5 is used, the UEs performing the initial access to the cell may have the problem similar to that occurring when the method 2 is used. That is, the UEs may not perform the PRACH transmission, EPDCCH reception, broadcast/unicast PDSCH reception, etc. until the start of the next BCCH modification. To solve this problem, the method 3 or 4 can be applied.

Method 6.

If a UE fails to receive the broadcast PDSCH (e.g., (part of) SIB, paring, RAR, etc.) rather than the unicast PDSCH before receiving the updated SIB, it may be a more serious problem. Particularly, failure in the paging reception may become more problematic.

To overcome this problem, i.e., to receive the broadcast PDSCH and an EPDCCH for scheduling thereof (or an EPDCCH transmitted through the CSS or an EPDCCH transmitted in a predefined resource region), the UE can use a predetermined CFI value (or a CFI value transmitted through the MIB). Alternatively, to receive the EPDCCH transmitted through the CSS or the EPDCCH transmitted in the predefined resource region and the PDSCH scheduled by the EPDCCH, the UE can use the predetermined CFI value (or the CFI value transmitted through the MIB). Further, to receive a PDSCH carrying the paging and an EPDCCH for scheduling the paging (or the EPDCCH transmitted through the CSS or EPDCCH transmitted in the predefined resource region), the UE can use the predetermined CFI value (or the CFI value transmitted through the MIB). To receive other EPDCCHs and/or PDSCHs, the UE can use the CFI value configured by the SIB.

Method 7.

To solve the problem that when the CFI in the SIB is updated, the UE cannot correctly receive the EPDCCH and/or PDSCH before receiving the updated SIB, a cell can operate (e.g., transmit the EPDCCH and/or PDSCH) by assuming that the worst CFI value is used in the first BCCH modification period. Thereafter, the updated CFI can be applied from the next BCCH modification period. Here, the worst CFI value may be the highest CFI value that the cell can have on the corresponding system bandwidth or the highest CFI value that the cell can have irrespective of the system bandwidth. For example, when the SIB updated notification is transmitted in the BCCH modification period (n), the UE can assume the worst CFI value in the BCCH modification period (n+1) to receive the PDSCH and EPDCCH except the SIB (or an SIB transmitted before the SIB including information on the CFI value) and then apply the updated CFI from the BCCH modification period (n+2).

Alternatively, the UE can apply the CFI value predetermined for the SIB transmission to transmit/receive other PDSCHs and EPDCCHs in the first BCCH modification period, where the updated SIB is transmitted after transmission of the SIB update notification, and then apply the updated CFI from the next BCCH modification period. For example, when the SIB updated notification is transmitted in the BCCH modification period (n), the UE can assume that the CFI value predetermined for the SIB transmission is applied to receive all PDSCHs and EPDCCHs in the BCCH modification period (n+1) and then apply the updated CFI from the BCCH modification period (n+2).

Method 8.

To solve the problem that when the CFI in the SIB is updated, the UE cannot correctly receive the EPDCCH and/or broadcast PDSCH before receiving the updated SIB, data can be mapped on the assumption that the worst CFI value is used in the first BCCH modification period, where the updated SIB is transmitted after transmission of the SIB update notification, for the purpose of transmission of the EPDCCH and/or broadcast PDSCH (e.g. paging, RAR).

Figure 14:
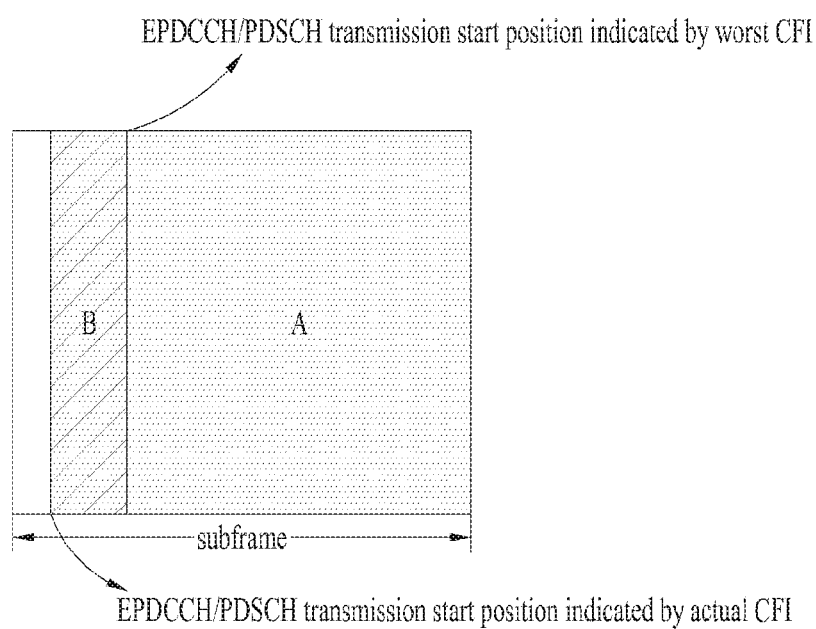
FIG. 14 illustrates a relationship between start positions of a control format indicator (CFI) and EPDCCH/PDSCH.

FIG. 14 illustrates a relationship between start positions of a control format indicator (CFI) and EPDCCH/PDSCH.

For example, as shown in FIG. 14, data can be mapped to 'region A' which is started from an OFDM symbol indicated by the worst CFI value rather than an actually configured CFI value. In this case, for UEs that know the CFI value by receiving the updated SIB, additional data can be transmitted in an OFDM symbol region (i.e., 'region B' of FIG. 14) from an OFDM symbol where the EPDCCH/PDSCH transmission can be initiated according to the actual CFI value to an OFDM symbol where the EPDCCH/PDSCH transmission can be initiated according to the worst CFI value. Particularly, as the additional data transmitted in the 'region B', part of the EPDCCH/PDSCH transmitted in the 'region A' may be repeatedly transmitted. In this case, rate-matching of data may be performed with reference to the amount of RE resources in the 'region A'.

Alternatively, to solve the problem that when the CFI in the SIB is updated, the UE cannot correctly receive the EPDCCH and/or broadcast PDSCH before receiving the updated SIB, instead of performing the data mapping by assuming that the actual current CFI value is used in the first BCCH modification period, where the updated SIB is transmitted after transmission of the SIB update notification, for the purpose of transmission of the EPDCCH and/or broadcast PDSCH (e.g. paging, RAR), UEs that do not know the updated CFI value can perform reception by puncturing the EPDCCH/PDSCH in the region (e.g., 'region B' of FIG. 14) consisting of OFDM symbols transmitted before the OFDM symbol indicated by the worst CFI by assuming the worst CFI. Particularly, in this case, when performing resource mapping for the PDSCH/EPDCCH, the eNB may first perform the resource mapping on the region A and then perform the resource mapping on the region B to allow the UEs to receive more systematic data.

<B. CFI Configuration>

In the case of an MBSFN subframe, the number of maximum OFDM symbols in which a PDCCH can be transmitted is 2 and it may be different from that of a non-MBSFN subframe. In addition, a subframe for the low-complexity UE may be the MBSFN subframe or non-MBSFN subframe. That is, a CFI indicating a value greater than 2 may be transmitted and this may cause a problem in UE operation. To solve the problem, the present invention proposes methods of informing a low-complexity UE of a CFI value in an MBSFN subframe.

Method X.

When the eNB configures the CFI value for the low-complexity UE through an SIB or MIB, the eNB may separately configure a CFI value for the MBSFN subframe and a CFI value for the non-MBSFN subframe. Thereafter, the UE receives both of the CFI for the MBSFN subframe and the CFI for the non-MBSFN subframe.

Method Y.

Although the eNB configures a single CFI value for the low-complexity UE through the MIB or SIB, the UE can assume that the corresponding CFI value is applied to the non-MBSFN subframe only and the CFI value for the MBSFN subframe is set to 2.

Method Z.

The eNB configures a single CFI value for the low-complexity UE through the MIB or SIB and the UE applies the corresponding CFI value to all the subframes. In this case, if the CFI value is greater than 2, the UE can assume that the CFI value for the MBSFN subframe is set to 2.

Meanwhile, there may be a problem in a relationship between PHICH duration and a CFI. The PHICH duration is transmitted through the MIB. Here, the MIB is 24-bits information including the following information:

3 bits for a system bandwidth;
3 bits for PHICH information, where a 1 bit indicates a normal or extended PHICH and the remaining 2 bits indicate a value of $N_g$ for determining the number of PHICH groups, which is constant in all subframes;
8 bits for a system frame number; and
10 bits are reserved for future use.

The PHICH duration can be changed according to a value indicated by PHICH information in the MIB. That is, the number of OFDM symbols in which a PHICH is transmitted is changed according to the PHICH information in the MIB. In general, the CFI value is equal to or greater than a value of the PHICH duration. In this case, there may be a case that the CFI value configured by the eNB through the MIB or SIB is smaller than the PHICH duration received by the low-complexity UE through the MIB. Particularly, this may occur when the system operates such that positions of subframes for transmission of the EPDCCH, PDSCH, etc. are allocated only for an MTC UE and thus, transmission of the PHICH, PDCCH, etc. for a legacy UE is minimized in the corresponding subframes. Hereinafter, a description will be give of UE operation in this situation.

Method A.

When the CFI value is smaller than the PHICH duration value configured by the eNB, the UE can assume the PHICH duration value, which is greater than the CFI value, as its CFI value.

Method B.

When the CFI value is smaller than the PHICH duration value configured by the eNB, the UE can discard the PHICH duration value and then determine the configured CFI value as its CFI value.

<C. EPDCCH Configuration>

In the following description, methods for configuring an EPDCCH search space (SS) will be explained. The methods in the section C may be used for solving the problem mentioned in the section A, i.e., the problem that when the CFI in the SIB is updated, the UE cannot correctly receive the EPDCCH and/or PDSCH before receiving the updated SIB.

First, an SS region can be divided into a first SS set and a second SS set. In this case, the first and second SS sets are time-division multiplexed with each other and they may be present in different subframes. For example, as SS existing in an odd-numbered subframe may belong to the first SS set and an SS existing in an even-numbered subframe may belong to the second SS set. Alternatively, the first and second SS sets may correspond to different EPDCCH sets, i.e., different EPDCCH-PRB-sets. Further, the first and second SS sets may be different USS (or CSS) regions and it may be considered that a UE has two USS (or CSS) regions.

In this case, a configuration for configuring a region for the first SS set and configurations for EPDCCH transmission (e.g., EPDCCH configuration) may be configured through the SIB or predefined. On the other hand, a configuration for configuring a region for the second SS set and configurations for EPDCCH transmission may be transmitted through a PDSCH scheduled by an EPDCCH transmitted in the first SS set.

Alternatively, the configuration for configuring the region for the first SS set and the configurations for EPDCCH transmission may be transmitted through a PDSCH scheduled by an EPDCCH transmitted in the second SS set. In addition, the configuration for configuring the region for the second SS set and the configurations for EPDCCH transmission may be transmitted through the PDSCH scheduled by the EPDCCH transmitted in the first SS set. That is, if a configuration for a specific SS set is configured through another SS set, it is possible to solve a problem that a UE cannot correctly receive an EPDCCH due to change in an EPDCCH configuration of an SS where the UE should receive the EPDCCH configuration. Particularly, initial configurations for the first and second SS sets (e.g., the configurations for configuring the SS set regions and the configurations for the EPDCCH transmission) may be predefined or configured through the SIB or RAR (or message 4).

<D. PBCH Transmission Pattern Update>

Figure 15:
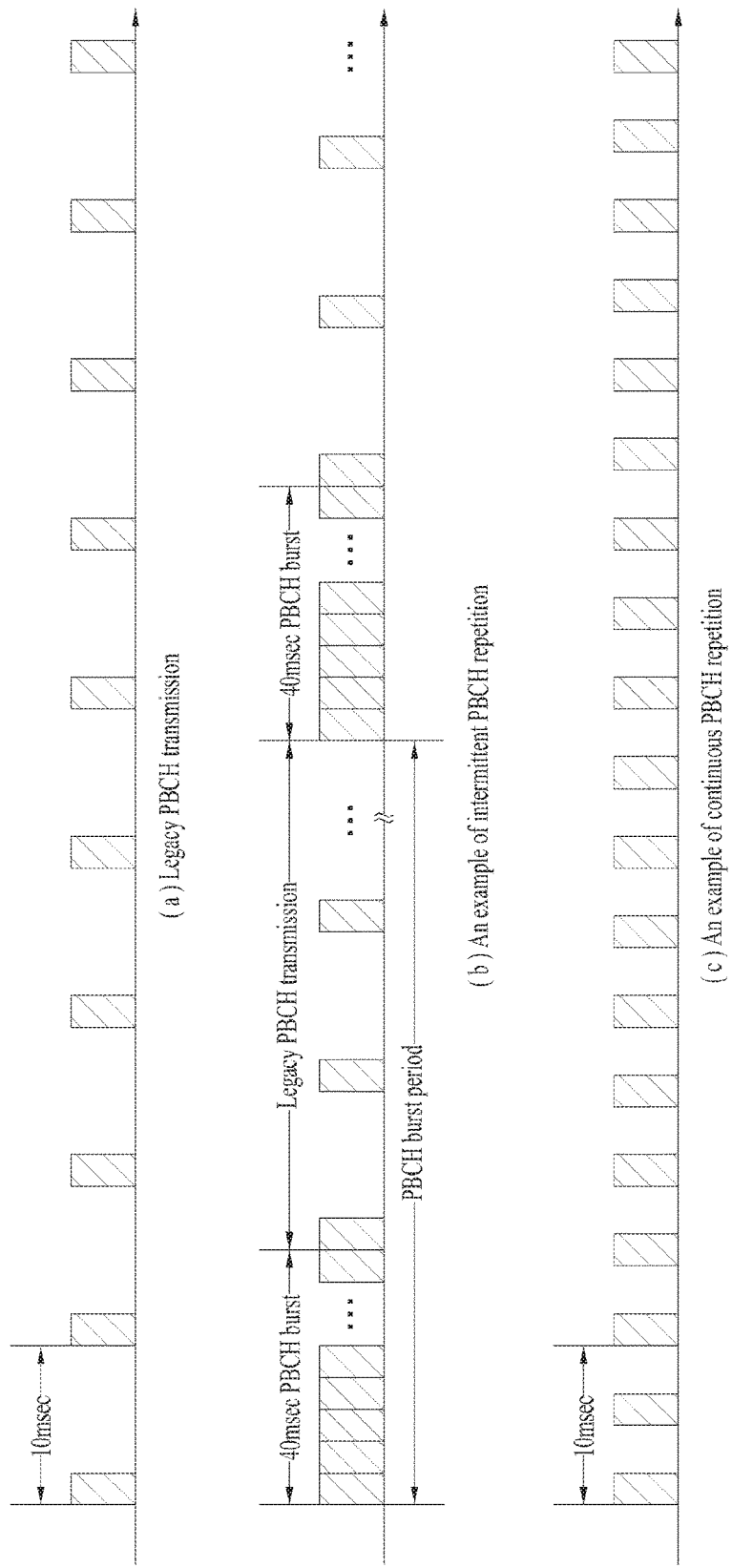
FIGS. 15 and 16 illustrates methods for enhancing coverage of a physical broadcast channel (PBCH).
Figure 16:
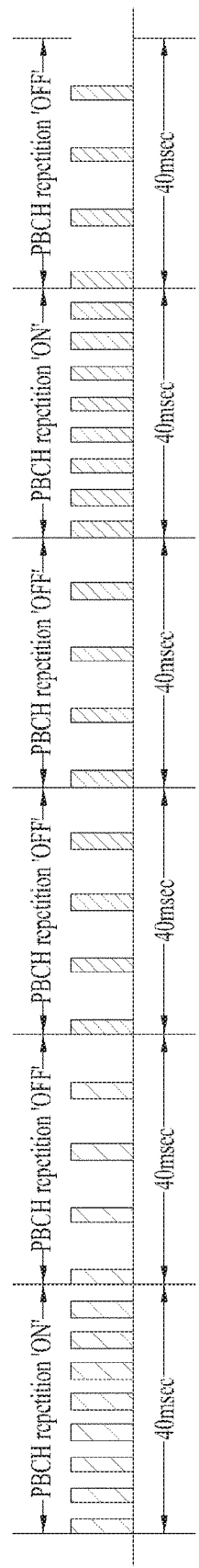

FIGS. 15 and 16 illustrates methods for enhancing coverage of a PBCH.

For the MTC UE that requires enhanced coverage, coverage of the PBCH needs to be increased. For the PBCH coverage enhancement, the PBCH can be repeatedly transmitted as shown in FIG. 15. In legacy PBCH transmission, the PBCH is divided into 4 segments, and these 4 segments are transmitted through subframe #0, #10, #20, and #30 every 40 ms as shown in FIG. 15 (*a*). When PBCH is repeated intermittently, as illustrated in FIG. 15 (*b*), repeated PBCHs are additionally transmitted within 40 ms and theses 40 ms PBCH bursts are transmitted intermittently. During the period where there is no PBCH transmission, only legacy PBCHs are transmitted. For continuous PBCH repetition, additionally repeated PBCHs are continuously transmitted as shown in FIG. 15 (*c*).

For the PBCH coverage enhancement, the PBCH is repeated within the 40 ms of PBCH burst of 40 ms and the 40 ms of burst where the repeated PBCHs are transmitted can be transmitted as follows.

Option A:
Repetition is transmitted in every 40 ms cycle.
Option B:
Repetition is dynamically turned on/off on a 40-ms cycle basis.
Option C:
Repetition is performed based on a pattern(s) across a given number of cycles.

That is, according to Option A, the 40 ms period of the repeated PBCH burst can be always transmitted at a cycle of 40 ms.

According to Option B, whether the repeated PBCH burst or the legacy PBCH is transmitted at every 40 ms during a specific period of 40 ms as shown in FIG. 16 (that is, ON/OFF of the repeated PBCH burst transmission) can be dynamically changed.

According to Option C, for the 40 ms period of the repeated PBCH burst, the '40 ms of the PBCH burst' can be transmitted according to a specific pattern within a specific cycle (e.g., 320 ms period). For example, according to pattern 0, since there is no period for transmitting the '40 ms of the PBCH burst', only the legacy PBCH may be transmitted at all times. According to pattern 1, the '40 ms of the PBCH burst' can be transmitted in the first period of 40 ms within a period of 320 ms at every 320 ms. According to pattern 2, the '40 ms of the repeated PBCH burst' can be transmitted in the first 40-ms period and the fourth 40-ms period at every 320 ms. In this case, the '40 ms of the PBCH burst' is transmitted at every 160 ms. As another pattern, for example, according to the pattern 2, the '40 ms of the repeated PBCH burst' can be transmission in the first to third 40-ms periods. That is, in this case, the '40 ms of the repeated PBCH burst' can be transmitted during first periods of 120 ms at every 320 ms. If a UE already connected to a cell is able to know the pattern for transmitting the '40 ms of repeated PBCH burst' (i.e., PBCH repetition pattern), the UE can rapidly read the PBCH with low complexity, compared to when the UE initially accesses the cell.

Meanwhile, in the option c, the PBCH repetition pattern used by the cell can be changed depending on time. This is because, for example, whether a specific cell supports coverage enhancement may be changed depending on time. When the PBCH repetition pattern used by the cell is changed, information indicating that the PBCH repetition pattern is changed or information on the changed PBCH repetition pattern needs to be transmitted to the UE already connected to the cell. This because, for example, in the case of the MTC UE, the UE can be aware of types of MTC UE (e.g., degree of the coverage enhancement) supported by the corresponding cell. To this end, the following methods are proposed.

Alt 1.

It is proposed to include information indicating that the PBCH repetition pattern is changed in an 'SIB update' field. That is, bit(s) for informing change in the PBCH repetition pattern may be included in the 'SIB update' field and then transmitted. Thus, by reading the 'SIB update' field, the UE can know whether the PBCH repetition pattern is changed. Such a 'SIB update' field can be transmitted to the UE through the paging or RRC signaling. More particularly, the UE can assume that the PBCH repetition pattern is transmitted through SIB1. When the PBCH repetition pattern is changed, update indication for the SIB1 may be performed for the changed PBCH repetition pattern. It can be assumed that the changed PBCH repetition pattern is applied at an end point of an SI update interval, i.e., an SI modification period, where the SIB update is performed. For example, it can be assumed that the previous PBCH repetition pattern is used at an interval i where the update is triggered and an interval (i+1) where the SIB is acquired and the new PBCH repetition pattern is applied from an interval (i+2). Moreover, the PBCH repetition pattern can be transmitted to a UE without the coverage enhancement feature and the UE assumes that the repetition is used for data rate matching.

Alt 2.

It is proposed to include the PBCH repetition pattern used by the cell or a PBCH repetition pattern to be used at a specific time in the 'SIB update' field. That is, by reading the SIB update field, the UE can know the PBCH repetition pattern used by the cell or the PBCH repetition pattern to be used at the specific time. Such an 'SIB update' field can be transmitted to the UE through the paging or RRC signaling. More particularly, the PBCH repetition pattern may be changed without the SIB update. In this case, an SI update field is set to 'false' and only a PBCH repetition pattern number may be changed. When the UE receives the update indication, the UE can assume that the new PBCH repetition pattern will be applied from the next SI interval after reception of the indication without performing the SIB update. In other words, although a procedure for the SI update may be used for the indication, the procedure may be used for changing the PBCH repetition without the SIB update. That is, the SI update procedure may be used to indicate the changed PBCH repetition pattern instead of the SI update. Considering a case that PBCH repetition pattern change is notified through a UE-dedicated or UE-group-dedicated signal similar to RRC, signaling of the SIB update indication may be independent from indication signaling of the PBCH repetition pattern change. For example, if a new RNTI (e.g., SIU-RNTI) is introduced and the SIB update indication is transmitted using the new RNTI, the PBCH repetition pattern may be transmitted using another RNTI or an occasion for transmitting the SIB update indication and an occasion for transmitting the PBCH repetition pattern may be separately configured.

Information on the PBCH repetition pattern used by the cell may be included in the SIB1 (e.g., SIB or SIB1 for use of MTC, which is received by the MTC UE). That is, for example, if the UE is informed that the SIB has been updated, the UE may know the PBCH repetition pattern by receiving the SIB1. As another example, if the UE is informed that the PBCH repetition pattern has been changed through the SIB update as described in the alt 1, the UE may know the PBCH repetition pattern by receiving the SIB1.

The embodiments described above in the sections A to D can be implemented independently or at least two of them can be applied together.

Figure 17:
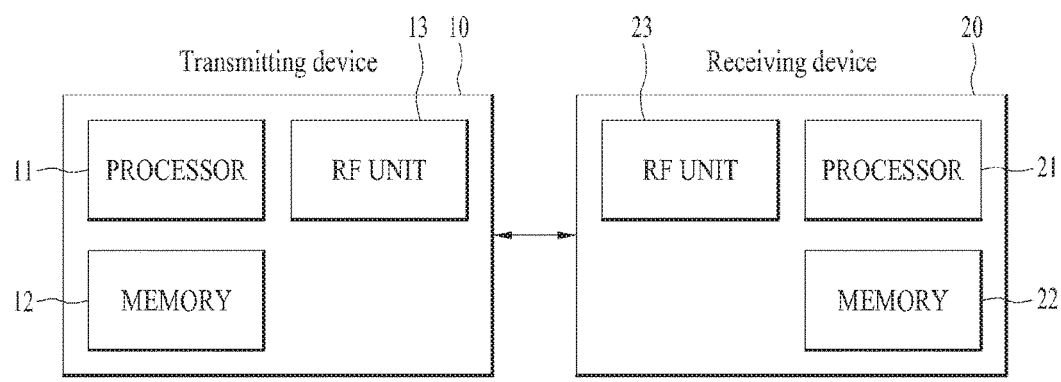
FIG. 17 is a block diagram illustrating components of a transmitting device 10 and receiving device 20 for implementing the present invention.

FIG. 17 is a block diagram illustrating components of a transmitting device 10 and receiving device 20 for implementing the present invention.

Referring to FIG. 17, the transmitting device 10 and receiving device 20 respectively include radio frequency (RF) units 13 and 23 for transmitting and receiving radio signals carrying information, data, signals, and/or messages, memories 12 and 22 for storing various information related to communication in a wireless communication system, and processors 11 and 21 functionally connected to the RF units 13 and 23 and the memories 12 and 22 and configured to control the memories 12 and 22 and/or the RF units 13 and 23 in order to enable the transmitting device 10 and receiving device 20 to perform at least one of the above-described embodiments of the present invention.

The memories 12 and 22 may store programs for processing and controlling the processors 11 and 21 and temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. When the present invention is implemented using firmware or software, the firmware or software may be configured to include modules, procedures, functions, etc. for performing the functions or operations of the present invention. Firmware or software configured to implement the present invention may be included in the processors 11 and 21 or stored in the memories 12 and 22 so as to be driven by the processors 11 and 21.

The processor 11 of the transmitting device 10 performs predetermined coding and modulation for a signal and/or data to be transmitted to the outside after being scheduled by the processor 11 or a scheduler connected to the processor 11, and then transmits the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer equal to or greater than 1) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ receive antennas and frequency down-converts each of signals received through receive antennas to restore each signal as a baseband signal. In addition, the RF unit 23 may include an oscillator for frequency down-conversion. The processor 21 decodes and demodulates the radio signals received through the receive antennas and restores data that the transmitting device 10 originally desires to transmit.

The RF units 13 and 23 include one or more antennas. An antenna performs a function for transmitting signals processed by the RF units 13 and 23 to the outside or transferring radio signals to the RF units 13 and 23 after receiving the radio signal from the outside under the control of the processors 11 and 21 according to an embodiment of the present invention. The antenna may also be called an antenna port. Each antenna may correspond to one physical antenna or may be configured by a combination of more than one physical antenna element. The signal transmitted from each antenna cannot be further deconstructed by the receiving device 20. A reference signal (RS) transmitted in correspondence to a corresponding antenna defines an antenna viewed from the receiving device 20 and enables the receiving device 20 to perform channel estimation for the antenna, irrespective of whether it is a single radio channel from one physical antenna or a composite channel from a plurality of physical antenna elements including the antenna. In other words, the antenna is defined such that a channel carrying a symbol of the antenna may be obtained from a channel carrying another symbol of the same antenna. An RF unit supporting the multi-input multi-output (MIMO) function of transmitting and receiving data using a plurality of antennas may be connected to two or more antennas.

In the embodiments of the present invention, a UE operates as the transmitting device 10 in uplink and as the receiving device 20 in downlink. In the embodiments of the present invention, an eNB operates as the receiving device 20 in uplink and as the transmitting device 10 in downlink. Hereinafter, the processor, memory, and RF unit included in the UE will be referred to as a UE processor, a UE memory, and a UE RF unit, respectively and the processor, memory, and RF unit included in the eNB will be referred to as an eNB processor, an eNB memory, and an eNB RF unit, respectively.

The eNB processor can control the eNB RF unit to transmit an updated SIB, i.e., SI according to any one of the embodiments of the present invention. In addition, the eNB processor can configures a field(s) in the SIB according to any one of the embodiments of the present invention. For example, the eNB processor can transmit at least one of a CFI value, SI including an EPDCCH configuration for an SS (e.g., EDPCCH-SetConfig), and SI for (newly) configuring or changing an SI modification interval according to any one of the embodiments of the present invention. Moreover, the eNB processor can apply the SI according to any one of the embodiments of the present invention. Furthermore, the eNB processor can control the eNB RF unit to transmit an EPDCCH and/or PDSCH to the UE based on the transmitted SI according to any one of the embodiments of the present invention. Further, the eNB processor can control the eNB RF unit to transmit a PBCH according to any one of the embodiments of the present invention.

The UE processor can control the UE RF unit to transmit an updated SIB, i.e., SI according to any one of the embodiments of the present invention. The SIB may include a field(s) updated according to any one of the embodiments of the present invention. For example, the UE processor can control the UE RF unit to receive at least one of a CFI value, SI including an EPDCCH configuration for an SS (e.g., EDPCCH-SetConfig), and SI for (newly) configuring or changing an SI modification interval according to any one of the embodiments of the present invention. In addition, the UE processor can apply the SI according to any one of the embodiments of the present invention. Moreover, the UE processor according to the present invention can control the UE RF unit to receive an EPDCCH and/or PDSCH based on the transmitted SI according to any one of the embodiments of the present invention. Further, the UE processor can control the UE RF unit to receive a PBCH according to any one of the embodiments of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein

INDUSTRIAL APPLICABILITY

The embodiments of the present invention can be applied to not only a base station and a user equipment but also other devices in a wireless communication system.

What is claimed is:

1. A method of receiving system information by a user equipment (UE), the method comprising:
receiving a system information update notification in a system information modification period n;
receiving updated system information in a system information modification period (n+1); and
applying the updated system information at a specific time after the system information modification period (n+1),
wherein information indicating the specific time is received in every system information modification period, and
wherein, in a case of the updated system information is applied, the information indicating the specific time is set to a specific value and then received.

2. The method of claim 1, wherein the specific time comprises a system information modification period (n+2), which is next to the system information modification period (n+1).

3. The method of claim 1, wherein the information indicating the specific time is included in the updated system information and thus received in the system information modification period (n+1).

4. The method of claim 1, wherein the updated system information includes information on a length of an updated modification period, wherein the updated system information including the information on the length of the updated modification period is received through a master information block, and wherein the updated system information includes at least one of information indicating whether the updated system information has been applied or will be applied, information on a length of a modification period before the updated modification period, or information on a length of a modification period in which the updated system information will be received.

5. The method of claim 1, wherein the updated system information includes at least one of search space information of an enhanced physical downlink control channel (EPDCCH) received in a data region of a subframe rather than a control region of the subframe or start symbol information indicating a start orthogonal frequency division multiplexing (OFDM) symbol of the EPDCCH.

6. A user equipment (UE) for receiving system information, the UE comprising:
    a radio frequency (RF) unit; and
    a processor configured to control the RF unit,
    wherein the processor is configured to:
    control the RF unit to receive a system information update notification in a system information modification period n;
    control the RF unit to receive updated system information in a system information modification period (n+1); and
    apply the updated system information at a specific time after the system information modification period (n+1),
    wherein the information indicating the specific time is received in every system information modification period, and
    wherein, in a case of the updated system information is applied, the information indicating the specific time is set to a specific value and then received.

7. The UE of claim 6, wherein the specific time comprises a system information modification period (n+2), which is next to the system information modification period (n+1).

8. The UE of claim 6, wherein the information indicating the specific time is included in the updated system information and thus received in the system information modification period (n+1).

9. The UE of claim 6, wherein the updated system information includes information on a length of an updated modification period, wherein the updated system information including the information on the length of the updated modification period is received through a master information block, and wherein the updated system information includes at least one of information indicating whether the updated system information has been applied or will be applied, information on a length of a modification period before the updated modification period, or information on a length of a modification period in which the updated system information will be received.

10. The UE of claim 6, wherein the updated system information includes at least one of search space information of an enhanced physical downlink control channel (EPDCCH) received in a data region of a subframe rather than a control region of the subframe or start symbol information indicating a start orthogonal frequency division multiplexing (OFDM) symbol of the EPDCCH.

11. A method of transmitting system information by a base station, the method comprising:
    transmitting a system information update notification in a system information modification period n;
    transmitting updated system information in a system information modification period (n+1); and
    applying the updated system information at a specific time after the system information modification period (n+1),
    wherein the information indicating the specific time is transmitted in every system information modification period, and
    wherein, in a case of the updated system information is applied, the information indicating the specific time is set to a specific value and then transmitted.

12. A base station for transmitting system information, the base station comprising:
    a radio frequency (RF) unit; and
    a processor configured to control the RF unit,
    wherein the processor is configured to:
    control the RF unit to transmit a system information update notification in a system information modification period n;
    control the RF unit to transmit updated system information in a system information modification period (n+1); and
    apply the updated system information at a specific time after the system information modification period (n+1),
    wherein the information indicating the specific time is transmitted in every system information modification period, and
    wherein, in a case of the updated system information is applied, the information indicating the specific time is set to a specific value and then transmitted.

\* \* \* \* \*